US012730817B2

(12) United States Patent
Armanious et al.

(10) Patent No.: US 12,730,817 B2
(45) Date of Patent: Sep. 8, 2026

(54) SYSTEMS AND METHODS FOR LEARNING-BASED NETWORK

(71) Applicant: Learning Chain Pty Ltd, Roselands (AU)

(72) Inventors: Amir Nasry Rofael Armanious, Roselands (AU); Nader Nasry Rofael Armaneous, Roselands (AU)

(73) Assignee: Learning Chain Pty Ltd., Roselands (AU)

( * ) Notice: Subject to any disclaimer, the term of this patent is extended or adjusted under 35 U.S.C. 154(b) by 0 days.

(21) Appl. No.: 17/800,885

(22) PCT Filed: Feb. 18, 2020

(86) PCT No.: PCT/AU2020/050140
§ 371 (c)(1),
(2) Date: Aug. 18, 2022

(87) PCT Pub. No.: WO2020/168383
PCT Pub. Date: Aug. 27, 2020

(65) Prior Publication Data

US 2023/0078010 A1 Mar. 16, 2023

(51) Int. Cl.

| | |
|---|---|
| ***G06F 16/2457*** | (2019.01) |
| ***G06F 3/0482*** | (2013.01) |
| ***G06F 16/248*** | (2019.01) |

(52) U.S. Cl.
CPC ...... *G06F 16/24573* (2019.01); *G06F 3/0482* (2013.01); *G06F 16/248* (2019.01)

(58) Field of Classification Search
CPC ............. G06F 16/24573; G06F 3/0482; G06F 16/248; G06F 16/334; G06F 16/2423;
(Continued)

(56) References Cited

U.S. PATENT DOCUMENTS

| | | |
|---|---|---|
| 6,633,742 B1 | 10/2003 | Turner et al. |
| 7,502,783 B2 | 3/2009 | Palmon et al. |

(Continued)

OTHER PUBLICATIONS

Written Opinion of Australian Application No. PCT/AU2020/050140 dated Apr. 15, 2020, 7 pages.

(Continued)

*Primary Examiner* — Yuk Ting Choi
(74) *Attorney, Agent, or Firm* — Womble Bond Dickinson (US) LLP

(57) ABSTRACT

A method and system is disclosed for searching and displaying a learning chain including topics associated with a user. The method includes at an electronic device with a display: displaying a first user interface having one or more search fields for receiving a search query; receiving, at the one or more search fields, a first search query, wherein the first search query identifies a first topic; in response to receipt of the first search query, search a database. The database stores data identifying: a plurality of topics, including the first topic, a second topic different to the first topic and a third topic different to the first and second topics; a plurality of users, including a first user and a second user different to the first user; an association between the first topic and the first user; a plurality of learning chains of topics, including a first learning chain that includes the first topic and the second topic and not the third topic and wherein the learning chain indicates that the second topic is associated with the first topic as adjacent topics in the first learning chain; an association between the first learning chain and the first user. The method further includes displaying search results, the search results including the first user responsive to the stored association of the first topic to the first user; receiving a selection of the first user; in response to receiving selection of the first user, displaying the first learning chain, wherein the first learning chain (Continued)

includes a graphical representation of the first topic, a graphical representation of the second topic and a graphical representation of the association between the first topic and the second topic. A method and system is also disclosed for searching and displaying a learning chain associated with a course offered by a user and for generating a learning chain.

19 Claims, 28 Drawing Sheets

(58) Field of Classification Search
CPC .. G06F 16/2428; G06Q 50/20; G06Q 50/205; G06Q 10/06
See application file for complete search history.

(56) References Cited

U.S. PATENT DOCUMENTS

2004/0229194 A1 11/2004 Yang
2006/0059143 A1* 3/2006 Palmon .................. G06F 16/35 707/999.005
2009/0319917 A1* 12/2009 Fuchs .................... H04M 3/56 715/753
2010/0228777 A1* 9/2010 Imig .................... G06F 16/285 707/E17.108
2011/0295861 A1* 12/2011 Lacasse ................ G06F 16/358 707/E17.069
2012/0233160 A1* 9/2012 Koomullil ............... G06F 16/34 707/E17.014
2013/0332853 A1* 12/2013 Jha .................... G06Q 10/1095 715/753
2014/0365885 A1* 12/2014 Carson ................ G06F 16/3344 715/708
2015/0140526 A1* 5/2015 Marino .................... G09B 7/00 434/353
2016/0147891 A1* 5/2016 Chhichhia ............. G06F 16/986 707/734
2016/0155346 A1* 6/2016 Wang ....................... G06N 5/04 434/353
2016/0260064 A1* 9/2016 Ahmed ................. H04L 67/306 434/353
2016/0275636 A1* 9/2016 Olenick .............. G06F 3/04847 434/353
2017/0243502 A1* 8/2017 Loh .......................... G09B 7/04 707/734
2022/0122475 A1* 4/2022 Luetjen ................... G06F 9/451 707/734

OTHER PUBLICATIONS

International Search Report of Australian Application No. PCT/AU2020/050140 dated Apr. 15, 2020, 4 pages.
International Preliminary Report on Patentability for Australian Application No. PCT/AU2020/050140 dated Aug. 23, 2022, 8 pages.

* cited by examiner

SYSTEMS AND METHODS FOR LEARNING-BASED NETWORK

CROSS-REFERENCE TO RELATED APPLICATION

The present application is a US national phase application under 35 USC Section 371 of International Application No. PCT/AU2020/050140, filed Feb. 18, 2020.

TECHNICAL FIELD

The present disclosure relates to methods and devices configured to generate new and useful human-machine interfaces or user interfaces, which provide functionality adapted to the general field of human learning.

The present disclosure also relates generally to user interfaces and electronic devices with application to a social network field and more specifically to a new and useful network to connect learners, create a learning chain to link topics and accessible learning management system at each topic.

BACKGROUND

In the learning process, a learner has to search courses, compare contents, stumble from where to start, guess the required courses for a dream job, struggle how to relate a certain topic to other topics, get overwhelmed with abundant resources for certain topic, struggle with lack of resources in another topic, waste time with content overlap among different courses, suffer from gaps between topics, study courses that do not lead to employability, inability of choosing the content of their courses, check accreditation, check prerequisites and check credit transfer. For the learner, this process is time-consuming and requires a substantial amount of training and experience across a number of selection criteria. This increases the cost and time involved in choosing a suitable course and can be cost prohibitive to many learners. In addition, any changes in skills gaps will require repeating these steps, and in some cases, learners quit one degree and enroll in another which increases the cost of learning and time spent between degrees. For example, some degrees are not up to date and it takes a long time for learning institutions to update their curriculum and fill in skills gap.

For education providers, the process can be similarly unsatisfying and inefficient. Educators spend a lot of time in explaining basic and prerequisite concepts rather than enhancing learners' skill and mentorship because learners are stumbling with what needs to be studied and in what sequence, besides lack of peer support. In addition, education providers waste a lot of resources on reproducing material which are similar to other learning institutions while these resources should be devoted to creating effective learning chains, personalized learning, mentorship, and new material development that cover existing gaps.

The inventors are aware of only very limited research and development in technologies to assist learners, education providers and other stakeholders in learning processes, For example, the use of technology includes navigable websites, electronic handbooks and similar electronic publications. These use traditional search and navigation tools and have significant limitations. The inventors consider there is a need for technology solutions, in particular electronic devices configured to assist learning process stakeholders, for example to ease the cognitive burden associated with use of existing technology.

SUMMARY

The inventors have identified a need in the education field to create a platform that connects topics in a logical sequence by creating a learning chain. The inventors have also identified a need for technologies to relevantly connect learners with peers, educators, researchers, learning institutions, MOOCs, publishers, and industry partners.

In some embodiments a learning management system is accessible along each part of the learning chain that includes learning material. More generally, embodiments of the system create associations in the database(s) containing stored learning material and provide user interfaces that interoperate with the association, including displaying a learning chain. This platform enhances transfer learning in which it improves learning of a new topic through the transfer of knowledge from a related topic that has already been learned.

Certain embodiments described herein address problems with the prior art by designing a platform and app that creates learning chains that connect topics in a meaningful sequence that promotes interdisciplinary, transdisciplinary, cross-disciplinary and multidisciplinary learning. A learning network may enhance web-based learning and sequential learning. Learners connect with peers to enhance peer learning, connect with educators for mentorship, connect with learning institutions for suitable courses, connect with MOOCs providers to avoid topics overlap/gap, connect with researchers for research-led learning, connect with publishers for suitable book, connect with industry partners for industry based-learning and connect with recruiters for filling skills gap. This network allows users to connect, create, search, collaborate, export and share their learning chains with their first, second and third degrees of connection. Learning chains assist learning institutions to discover skills gap, missing topics, overlapping topics and a shortage of specialized educators in one field. It allows learners to share their knowledge/experience with peers around the world, consequently, any learner has access to high-quality learning regardless of where they live. Sometimes there is a shortage of educators in certain areas so through this platform educators/peers could assist learners remotely and share their knowledge, skills, and experience.

Learning chains build bridges between different ideas and concepts, thus may help learners visualize relationships and retain information more effectively. In some embodiments the platform includes disciplines of study as big nodes (e.g. circles). By selecting, e.g. clicking using a point and click device or touching on a touch screen, a certain discipline, it shows the major areas within this discipline as smaller nodes. By selecting one of these areas, it shows the major topics within this area as smaller nodes. Further, selecting the topic may show the sub-topics, selecting the sub-topic show sub-sub-topics and so on. The number of topics and connections may be reflected within each node. In some embodiments each discipline is drawn as imaginary concentric circles where topics are located on the imaginary multi concentric circles and these circles are not closed because they are connected with other imaginary multi concentric circles in a learning chain.

Learning chains could start from school to university and afterward or learning chains could start at a certain course without linking prior topics. The start of a learning chain may be visually distinguishable, to indicate the absence of prior linked topics. For example, the starting circle in black may indicate the chain starts from a certain topic without connecting prior chains. A user has the option to connect these learning chains. When additional topics are added to the start of the learning chain the visual characteristic are updated to reflect the change, for example by representing the previous starting circle in a color other than black. Each node in the learning chain shows learners and educators of these subtopics so learners could connect with peers and educators who share the same interest. There is a learning management system at each node of a learning chain that includes communication tools and learning material.

Each learning institution (school, college, university, institute, training center, etc.) that offers a course, certificate or degree connects nodes of existing topics to form learning chains. Learning institutions connect topics from one course to another, from one semester to another and from one year to another that enhances sequential learning. Learning institutions may create a highly detailed level of sub-topics to reflect each detail of any topic. Learning chains could be publicly available or private or shared with a certain user or group of users (for example, mentors, recruiters, peers, or other users or groups of users). Learning chains could be separate or integrated. Publishers may provide a learning chain of each book to check the sequence of topics within each chapter and interdependence of chapters. Researchers may provide a learning chain for each research paper.

These learning chains may be utilized in efforts to solve two major problems within the education system which are topics overlap among courses that wastes learners' time and topics gap in which learners struggle to understand some topics because they lack a prior knowledge on this topic and they do not know from where to start. MOOCs suffer from low completion rate because there is too much content for a topic and lack of content for another topic, and once learners finish a certain course, they do not know what to study next, for example to get their "dream job". Some courses are not well structured so a learning chain assists them with better structure by connecting topics in a reasonable sequence without content gaps or content overlaps. At any point, when learners stumble with a certain topic, they could check backwards in a learning chain to figure out the prior knowledge they need to construct to understand this topic (either one step or multi-steps backward) and learners could easily check forward learning chain in order to figure out what they need to learn to get their dream job. If a person would like to shift from one career to another, they can check the learning chain to identify from where to start and what topics and skills required to make that shift based on their existing experience. In addition, learners could collaborate with peers and educators at each node for a specific topic which enhances tutoring.

Not all learners share the same knowledge nor skills, in addition, learners learn at different paces so a learning chain assists in fitting the needs of each learner by discovering their potential and optimizing their skills through sequential learning instead of using "one size fits all" approach.

In some embodiments learning institutions show the estimated time duration and credit points for each node so learners can choose the contents of their courses themselves by choosing topics from a learning chain to tailor courses based on their needs, which enhances personalized learning. This makes the learning process more flexible and efficient as learners could form courses based on their needs and stack these courses into a formal certificate or degree in order to match the skills for a certain job instead of a general degree. Furthermore, learning chains may be certified by official learning institutions. Some chains could be attributed to skills developed at work and it could be certified by companies. Some chains could not be certified as they are based on independent learning which requires assessment by learning institution for accreditation. Consequently, learning chains assist learning institutions to transfer credit points based on recognition of prior learning by accessing learner's learning chain that's certified by learning institutions. This supports micro-credentials as learners choose what they learn, at their own pace and how far they want to learn at a time.

In some embodiments learners connect with learning institutions in order to choose the right degree, certificate, and course based on their needs. Learners may compare learning chains of different learning institutions for better selection. Learners check what they will learn through learning chains before enrolment in any course/certificate/degree. Learners may connect with their peers so learners who study the same topic could connect together to enhance peer learning. Learners connect, collaborate, exchange ideas, construct knowledge, share personal experience, improve best practices with their peers. Sometimes learners learn better from their peers because they share the same age group, culture, attitude, etc. so peer learning assists learners professionally and socially as they support each other during the learning journey which enhances social learning that has an exponential effect. Connecting peers encourages lifetime learning mindset as everyone in the network learns every day, get the support and motivation to keep going and connect with like-minded users. Learners connect with educators on the same node so they know whom to ask directly for enquires and mentorship which makes the process of learning more efficient. Learners learn the basic concepts themselves and with their peers and they contact educators for challenging concepts, so an educator's time is allocated effectively between efficient teaching, mentoring, coaching and influential research.

In some embodiments an educator connects with other educators and learning institutions connect with other learning institutions for better collaboration and eliminating the reproduction of existing contents but rather covering knowledge gaps and develop new contents. Learning chains assist in identifying the lack of expertise in a certain area, so learning institutions may hire a suitable educator. Educators could collaborate online, so they do not need to be physically existent in a certain institution which covers expertise gap. Learning institutions connect topics with research papers.

In some embodiments, when a learner struggles to understand a certain research paper or other topic, the learner navigates backward through an associated learning chain to know the prerequisite topics that need to be studied to be able to comprehend and/or replicate the research paper. Learning chains of research papers could be prepared by researchers, educators, industry professionals and learners have the option to check different chains and choose the suitable chain that matches their learning style.

In some embodiments each learning chain has a different color scheme to distinguish them. Learning institutions connect with recruitment agencies and companies to build close links with industry. Learning chains assist learning institutions to discover the skills gap, so they develop course curriculum based on what's needed in the market which is a continuous dynamic process. In some embodiments a search module is provided. The search module may be a browser or application interface in which a learner searches for topics, users, learning institutions, degrees, courses, educators and peers. A learner searches a certain topic, and chains are displayed by each institution, for example by the learner choosing a certain institution from a list of institutions offering the topic, to display its learning chain or a learner could choose multiple institutions so there will be multiple learning chains that would be displayed and each one with a different color to distinguish each institution. Once the learning chain is selected, a learner could search this chain either forward to check what to be studied next, for example for a certain career, or backward to check the prior topics required to comprehend the current topic. A learner could zoom in and out, a learner zooms in to check the sub-topics within each topic and how they are connected and zooms out to check the major topic that comprises all these subtopics.

In some embodiments a learner may search educators, peers, and careers, for example using the same search tool, by highlighting which criteria to display. In some embodiments the search results return the chains with the most connections first, then followed by two degrees of separation, three degrees, etc. The platform may have an export module that enables learners to export the entire or part of the learning chain, either with major topics or with each detail in a link, PDF, image format, etc. A learner can search for suitable internships, graduate programs, and vacancies by checking the required learning chain for each vacancy and recruitment agencies could check the learning chain of each learner to find the suitable candidate for a certain vacancy.

In some embodiments a learning management system (LMS) is provided that includes learning material, activities, communications, and assessments associated with one or more nodes or one or more learning chains. A collection of nodes could have an LMS in addition to each node's LMS. In addition, a course has its own LMS in addition to each node's LMS and collection of nodes' LMS. Learners and educators could collaborate using synchronous communication (chat, online video streaming, etc.) or asynchronous communication (mail, discussion, blog, etc.), these communications imitate at a certain node and stored in this node's LMS which assists learners to archive and retain information effectively.

Topic-based communication forums and topic-based discussion forums may enable better engagement and be easier to follow the flow of information. In some embodiments, the LMS may send a message to learner's cellular phone to remind them about their assessments on periodic times before the deadline. Learners could reply with done or progressing. If learners reply with done, learners will not receive further reminders. In addition, this messaging service could be used as a way to follow up with learners and record their learning progress, so they get adequate support if they are struggling. A chatbot is used at each node, collection of nodes and course in order to facilitate the administrative stuff and answer learners' inquiries. Chatbots complete tasks such as classroom management, scheduling, etc. Thus, educators may have more time to mentor learners and enhance their skills.

In some embodiments the LMS for each node has a recommendation system in order to move to the next node. Each topic is composed of basic knowledge and analytical skills. A learner is recommended to pass the basic knowledge in order to be able to move to the next topic. A question bank is prepared at each node and learners are assessed through a certain number of random questions. Multiple attempts are allowed and learners are recommended to get the full mark in order to pass to the next node. These criteria ensure learners have the basic knowledge and skills to understand the next topics which are based on current/previous topics.

In some embodiments a dashboard system provides progress reports of the user's activities. Data regarding activity logs of each learner during a certain period is generated and analyzed by the platform. These analytics show the number of accesses using username and password, total number of clicks that learners perform for accessing learning chains during their visits, the number of times a learner accessed the learning chain by pressing learning material, attempted practice questions, watched online videos, etc. that assists educators to measure their performance and provide the right support and effective mentorship. The analytics are cross-sectional among users and time-series over time. It shows the analytics of each topic and subtopic during a certain period of time to check which parts learners struggle with. Some dashboards could be released to learners and other dashboards are available to educators only. The platform allows learners to provide feedback and ratings of peers, educators and learning institutions. Educators provide ratings/feedback/recommendation for learners.

In some embodiments, the platform analyses a learner's performance in real-time that may enable educators to modify the curriculum based on such data and tailor teaching pedagogies for that learner. The platform may enhance adaptive learning for each learner using learning analytics. In addition, such analytics may enable a personalized engagement that's is adopted for the user's needs for a better learning journey. The platform may use predictive learning and analytics to predict the performance of each learner, consequently suggest appropriate measures to assist learners in a better way to optimise their strengths and work on their weaknesses. The platform suggests learning paths that the learner should follow. The learner gets suggestions from studying materials and other learning methodologies. In some embodiments, a machine learning algorithm is used for better content, curriculum organization and management. Learning chains may enhance personalised learning by giving each learner an individualized educational experience. Learners are guided for their own learning in their learning chains, make their own decisions about what to learn, and can follow the pace they want. In some embodiments, an artificial intelligence algorithm is used to mark various types of assessments for accuracy, avoid biases and saving more time for educators for coaching and mentoring.

In some embodiments, an option is provided in the dashboard system to indicate that the user is available to chat with another user or a certain group of users (e.g. peers, educators, or industry professionals). It could be for users in their connection or followers. The users show their availability to chat about topics related to a certain node for efficient conversation. In one embodiment, a messaging app connects users who are available at that time using a certain algorithm. A user sees the suggestion and swipes right to accept the chat or swipes left to decline the chat and get another user who is available. A user could have a wish list in which the users get a notification when one of the users is available online to chat with. A user could also assign a priority to a user based on categorisation. For example, educators show they are available online to educators' classes only so any of the learners in that class could communicate with this educator. The chat could be audio or visual. This may build a friendly learning community in which users get the best use of their time and skills to support each other with purpose.

In some embodiments each learner has a profile that includes basic information, a photo, a learning chain, learning institutions and companies worked with. A user's learning chain(s) may start from school and continue to college, university and during their learning journey including both formal and informal education. Any time a learner enrolls in a course, its content shows up in learner's learning chain and if a learner has self-study of some topics, the learner could add them to a learner's learning chain. When an educator teaches a course, its content shows up in the educator's learning chain. Learner's chain is updated regularly even during work because learning is a lifetime process and learners acquire knowledge and develop skills from industry and it is important to share it with connections. In addition, it shows the career chain by showing all the jobs of a user in a chain. It also shows the company chain by showing all companies a user worked within a chain. It enhances independent lifelong learning.

In some embodiments the system generates an updated feed based on the nodes the learner is currently learning and uses an algorithm to match with comments, articles, news, blogs, posts, ideas, learning material, training courses, internships and jobs from connections who are in the same node mainly and first forward/backward node. The system suggests content based on learning habits, if a certain learner reads more about a certain topic, the system suggests similar content to that learner as well as forward/backward contents on the learning chain as each topic has pre-requisite topics and subsequent topics. The content may be viewed or described as horizontal content and vertical content. For example horizontal content may refer to contents related to the same topic but from different sources. Vertical content may refer to the contents on the learning chain, it could be forward contents that refer to the next topics to learn or backward content that refers to prior content that is required to understand the current topic.

In some embodiments a learner can request guidance to a certain topic. In response the platform connects this learner with educators in the same topic who are online and mark their availability for a certain period and ask them to provide the required support. The platform provides information about educators including name, learning chain, qualifications, affiliation and a number of inquiries this educator helped with. Learners and educators could collaborate online or face to face. Users can share their location in real-time with peers so users who are near each other could meet for conversation or form a study group. After the collaboration, the platform will ask learners to rate education providers (educators or peers) from 1 to 5 stars as well as provide qualitative feedback in order to enhance a community of learning, accountability, and integrity for everyone. An educator has the option to provide the service for free or for a certain fee, an online payment system could be used by learning institutions/educators if they charge learners a fee. This platform promotes a high quality of education regardless of the location of the learner.

In some embodiments, there is provided an impact-based system in which an educator mentors some learners, so the mentor gets points for each learner and if one of these learners mentored other users, this learner and his/her educator get points for mentoring which is based on the concept of pyramid learning. In some embodiments, there is a reward system for learners which is based on various dimensions such as a number of topics learned, material learned at each topic, communication with peers and educators, questions and answers.

In some embodiments learning institutions use this platform to show the prerequisite, corequisite, and anti-requisite courses. If courses are on the same connection sphere, this means a core-requisite course. If courses are on the next sphere with a connection, this means a pre-requisite course. If an elective course cannot be placed on the learning chain, this means an anti-requisite course.

This disclosed system and methods may have a significant degree of customization. The platform can be customized with institutional branding and a tailored look and color. It also allows for a central access point to all of the institution's online services. The platform is scalable in order to accommodate increasing numbers of users as it is cloud-based.

In some embodiments learning institutions are ranked based on how this institution prepares its learners to get their dream job based on their study. If a learner studied a certain field and worked in this field, this means higher ranking for this institution because it helped learners to discover their potential, get the right support and get their dream job which is an efficient use of resources.

The assistance to learners, education providers and/or other stakeholders in learning processes described above may be provided by, facilitated by, or based on the methods and electronic devices disclosed herein, including for example the methods and devices described in the following paragraphs.

According to a first aspect of the invention, there is provided a method including: at an electronic device with a display: displaying a first user interface having one or more search fields for receiving a search query; receiving, at the one or more search fields, a first search query, wherein the first search query identifies a first topic; in response to receipt of the first search query, search a database, wherein the database stores data identifying: a plurality of topics, including the first topic, a second topic different to the first topic and a third topic different to the first and second topics; a plurality of users, including a first user and a second user different to the first user; an association between the first topic and the first user; a plurality of learning chains of topics, including a first learning chain that includes the first topic and the second topic and not the third topic and wherein the learning chain indicates that the second topic is associated with the first topic as adjacent topics in the first learning chain; an association between the first learning chain and the first user; displaying search results, the search results including the first user responsive to the stored association of the first topic to the first user; receiving a selection of the first user; in response to receiving selection of the first user, displaying the first learning chain, wherein the first learning chain includes a graphical representation of the first topic, a graphical representation of the second topic and a graphical representation of the association between the first topic and the second topic.

According to a second aspect of the invention, there is provided a method including: at an electronic device with a display: displaying a first user interface having one or more search fields for receiving a search query; receiving, at the one or more search fields, a first search query, wherein the first search query identifies a first user; in response to receipt of the first search query, search a database, wherein the database stores data identifying: a plurality of topics, including a first topic, a second topic different to the first topic and a third topic different to the first and second topics; a plurality of courses, including a first course and a second course different to the first course; a plurality of users, including the first user and a second user different to the first user; an association between the first course and the first user; a plurality of learning chains of topics, including a first learning chain associated with the first course; displaying search results including the first user and displaying one or more courses offered by the first user; receiving a selection of a first course of the one or more courses; in response to receiving selection of the first course, displaying the first learning chain, wherein the first learning chain includes a graphical representation of a plurality of topics, including the first topic and the second topic adjacent in the first learning chain to the first topic.

The database may store data identifying an association between the second user and the second topic and the method includes: while displaying the learning chain, receiving a selection of the second topic; receiving input requesting display of users associated with the second topic; based on the stored association between the second user and the second topic, displaying indicia identifying the second user.

The database may store data identifying adjacent topics in a plurality of the learning chains, including the first learning chain, and wherein the graphical representation of at least the first topic is provided with one or more visual indicators indicating the number of topics adjacent to the first topic in the plurality of learning chains.

The database may store data identifying a plurality of said topics as associated with either or both of the first topic and the second topic as sub-topics, and wherein the graphical representation of the first topic and the graphical representation of the second topic are dimensioned to be indicative of the number of sub-topics associated with the respective first topic or the second topic.

The database may store data identifying a second learning chain, the second learning chain including a plurality of sub-topics associated with the first topic and wherein the method includes, while displaying the first learning chain, receiving a selection in relation to the first topic and in response to the selection displaying the second learning chain.

The method may further include receiving user input of a third user editing at least one of the graphical representation of the first topic, the graphical representation of the second topic, and the graphical representation of the association between the first topic and the second topic and wherein the method includes storing in the database, associated with the third user, a third learning chain, the second learning chain being the first learning chain edited in accordance with the received user input.

The graphical representation of the first topic may be provided with an affordance and selection of the affordance transitions the first user interface to a second user interface for displaying learning material related to the first topic.

The method may further include: displaying a first affordance on the first user interface; receiving a user selection of the first affordance and a user selection of the first topic; in response to selection of the first affordance and selection of the first topic, replace the display of the first learning chain with a second learning chain including a graphical representation of one or more sub-topics associated with the first topic and a graphical representation of the associations between the one or more sub-topics.

The method may further include: displaying a second affordance on the user interface; receiving a user selection of the second affordance and a user selection of the first topic; in response to selection of the second affordance and selection of the first topic, replace the display of the first learning chain with a third learning chain including a graphical representation of one or more courses associated with the first topic and a graphical representation of the associations between the one or more courses.

The method may further include: displaying, on the first user interface, a first part of the first learning chain and a third affordance; receiving a user selection of the third affordance; in response to selection of the third affordance, replace the display of the first part of the first learning chain with a second part of the first learning chain, different to the first part of the first learning chain.

The method may further include: displaying, on the first user interface, the second part of the first learning chain and a fourth affordance; receiving a user selection of the fourth affordance; in response to selection of the fourth affordance, replace the display of the second part of the first learning chain with the first part of the first learning chain.

The third affordance and/or the fourth affordance may be provided with a visual indicator indicating a number of topics in the first learning chain that are not currently displayed and which are displayed by one or more selections of the third or fourth affordance respectively.

The database may store data assigning a public or a private permission for displaying the first learning chain to each of the plurality of users.

According to a second aspect of the invention, there is provided a method including: at an electronic device with a display: displaying a first user interface having: one or more selectable fields for selecting a field of study; a first area for displaying a learning chain associated with the field of study; a first affordance for adding one or more topics associated with the field of study to the first area; and a second affordance for connecting two or more topics in the first area; receiving, at a first selectable field, a user selection identifying the field of study; in response to receipt of the user selection, search a database, wherein the database stores data identifying a plurality of topics associated with the field of study, including a first topic, a second topic different to the first topic and a third topic different to the first and second topics; displaying search results including the first topic and the second topic in a second selectable field; receiving user selection of the first topic and the second topic in the second selectable field and user selection of the first affordance; in response to receiving selection of the first affordance and selection of the first topic and the second topic, display a graphical representation of the first topic and a graphical representation of the second topic in the first area; receiving user selection of the second affordance; in response to receiving selection of the second affordance, generating a learning chain by displaying a graphical representation of the association between the first topic and the second topic and updating the database to include a stored association between the first topic and the second topic.

According to a third aspect of the invention, there is provided a system including: an electronic device with a display; one or more processors; a database; and memory storing one or more programs configured to be executed by the one or more processors, the one or more programs including instructions that, when executed by the one or more processors, cause the electronic device to perform the method of any one of the first aspect or the second aspect.

BRIEF DESCRIPTION OF THE DRAWINGS

These and other features, aspects, processes, and advantages of the present invention will become better understood with regard to the following description, appended claims, and accompanying figures. At least one embodiment of the present invention will now be described with reference to the drawings, in which:

DETAILED DESCRIPTION

Figure 1:
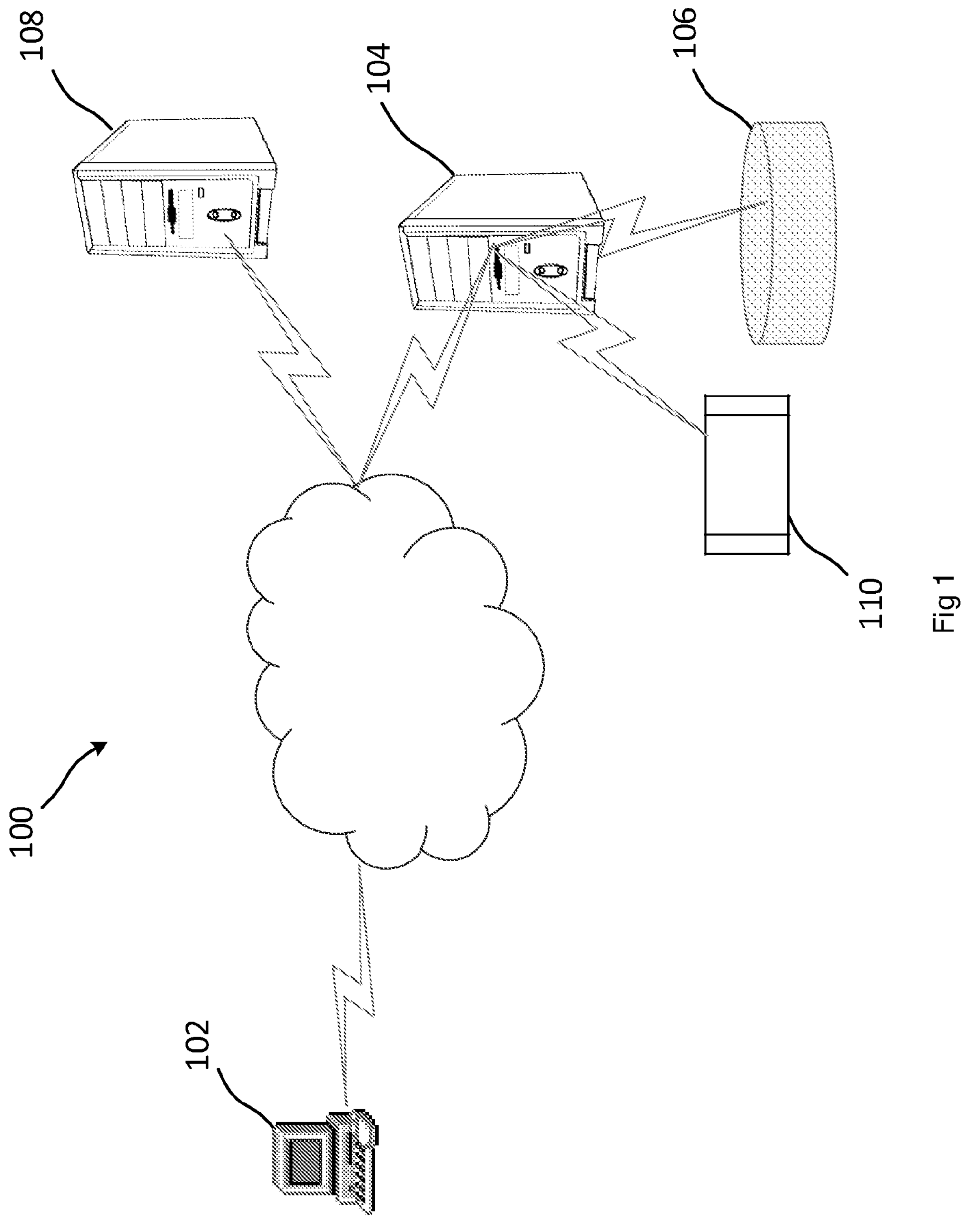
FIG. 1 is an overall block diagram of the system.

The present invention overcomes the limitations of the prior art by providing a learning chain design system. The system creates separate or integrated learning chains that connect learners with their peers, educators and industry professionals along the chain. By incorporating learning chains from learning institutions, the system provides a powerful tool for learners to connect all topics together in a logical sequence and connect learners with peers, educators and industry professionals who share the same interests.

The system is mutually beneficial to learners and education providers. Learners have access to learning chains of various learning institutions in which they can search and compare learning chains to select suitable courses. The network allows users to connect with other users, search existing learning chains, create new chains, and share their learning chains with other users. A learning chain assists users to discover missing topics, overlapping topics, the skills gap and a shortage of educators specializing in one field. The system assists education providers to reach a wider audience and collaborate with other education providers to provide the best learning experience to learners given their time and resources constraints. The system promotes the efficient use of learning institution resources.

A design learning platform can be provided for users to create learning chain using user-friendly drag and drop tool and customizable templates from the system. The design learning platform can be accessed through a web browser and/or a native application on the user's computer or mobile device. A user could create a learning chain, save it and work on it later. Once finished, the user has the option to share the learning chain with the public or keep it private or share it with a certain user or group of users (for example, mentors, recruiters, peers, or other users or groups of users).

All dimensions specified in this disclosure are by way of example only and are not intended to be limiting. Further, the proportions shown in these figures are not necessarily to scale. As will be understood by those with skill in the art with reference to this disclosure, the actual dimensions, and proportions of any system, any device or part of a system or device disclosed in this disclosure will be determined by its intended use.

Methods and devices that implement the embodiments of the various features of the invention will be described with reference to the drawings. All figures specified in this disclosure are by way of example only and are not intended to be limiting to the methods and tools of the system. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments can be practiced without these specific details. Well-known structures and techniques cannot be shown in detail in order not to obscure the embodiments. For example, algorithms can be shown in block diagrams in order not to obscure the embodiments in unnecessary detail.

In addition, it is noted that the embodiments can be described as a process that is depicted as a flowchart, a flow diagram, a structure diagram, or a block diagram. Although a flowchart can describe the operations as a sequential process, many of the operations can be performed in parallel or concurrently. Similarly, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, embodiments can be implemented by hardware, software, firmware, middleware, microcode, or a combination thereof. When implemented in software, firmware, middleware or microcode, the program code or code segments to perform the necessary tasks can be stored in a machine-readable medium such as a storage medium or other storage(s). One or more processors can perform the necessary tasks in series, distributed, concurrently or in parallel. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

In the following description, certain terminology is used to describe certain features of one or more embodiments of the invention.

The term "chain" refers to learning chain, company chain, career chain, other chains that comprise of related items that need to be presented in a sequence.

The term "mobile device" refers to smartphones, tablets, and other mobile devices that comprise the ability to interact with the Internet.

The term "plug-in" refers to plug-in a software component that adds a specific feature to an existing software application.

The term "publish" refers to finalizing a learning chain which contains a sequence of topics by saving the chain, creating a web compatible version of the chain, creating an electric copy in a secure format, exporting the chain to another format, printing the chain, downloading a copy, or any other method for completing the chain contemplated at present or in the future.

The term "user" refers to any user or groups of users of the methods and devices disclosed herein including, for example, learners, peers, educators, learning institutions, companies, researchers, industry professionals or recruiters.

Various embodiments provide a system for the learning-based network. In an additional embodiment, a method for using the system is provided. The system and method are disclosed in detail.

Referring to FIG. 1, there is shown a diagram of a learning network design system 100 according to one embodiment. The system 100 comprises a user's computer 102, a licensing server 104 and a repository system (design element database) 106. In a preferred embodiment, a user accesses non-transitory instructions executable on the user's computer from an application server 108. The application server presents the user with a design program used to access the repository system 106. In another embodiment, the user's computer can comprise non-transitory instructions to create learning chain designs and receive licenses from the licensing server 104 for design elements received from the design element database 106. The export module 110 can be part of the license server 104 or be a separate component that operates in cooperation with the design interface 500 and the license server 104. The export module 110 converts the final chain to a final output. In one variation, the exported design element is delivered as a link, PDF, image, digital file, etc.

Using any of the system 100 options above, the user can create learning chains design and experiment with various layouts. Using the system 100, users can connect with other users for better collaboration. The system 100 is a design platform served from a distributed computing system, a computing cluster, a server, or any suitable computing server infrastructure. The system can additionally be cooperatively implemented with a portion of components operational on a native or user-side application or plug-in. The system is applied towards the creation of learning chains, but the system can additionally or alternatively be applied to connect learners, educators, learning institutions, MOOCs, publishers, researchers, recruiters, industry professionals, and companies.

Learning chains are preferably stored in an Internet-accessible database, the cloud or repository 106. Some learning chains can comprise multiple learning chains from different learning institutions. In this instance, the learning chain will have multiple education providers tracked by the system 100. For example, a learner has one main learning chain since school till university and beyond, this learning chain is composed of learning chains from primary school, preparatory school, secondary school, college, university and career development that reflects the intercedence of all topics learned during learner's formal education. The license server 104 also comprises instructions to regulate and manage the export/publishing process of learning chains. The license server 104 can additionally function to regulate the use of published learning chains. As described above, users can use existing fields of study while creating their learning chains or use customized templates 500 to form their own chains. The license server 104, in combination with a learning chain design interface 600 on the user's computer 102 and the repository 106 of learning chains, can enable the use of learning chains with high resolution (pixel area).

The repository 106 may, for example, be a relational database that includes one or more tables and one or more relational operators for referencing the data stored in the one or more tables. In one example, the relational database may include a 'Careers' table, a 'Courses' table, a 'Topics' table, a 'Learning Chains' table, an 'Educators' table and a 'Users' table as described below. Each table is associated with one or more rows or columns for storing data and each row is provided with a key for referencing and associating the data stored in the one or more tables. For example, a key for the 'Courses' table may be a unique course ID and the key of the 'Users' table may be a user identifier.

A 'Careers' table may include a list of careers and be referenced by relevant courses and topics which lead to the specific career. For example, for a career in Counselling, the table may be referenced by courses such as a Diploma of Counselling, degrees such as Bachelor of Counselling and a postgraduate degrees such as a Graduate Diploma or Masters in Counselling at a variety of different institutions.

A 'Courses' table may include a list of courses, and be referenced by topics within each specific course.

A 'Topics' table may include a list of topics and be referenced by sub-topics within each topic. If a topic is, for example, a school or university subject, relevant sub-topic data may include sub-topic duration (from which topic duration may be determined) and sub-topic sequence information. Further sub-topic data may relate to sub-topic learning material, anticipated sub-topic learning outcomes, and further related material for example links to relevant book chapters or research papers.

Topics may be referenced by topic prerequisites, co-requisites, or anti-requisites. Topics may further be referenced by, for example, equivalent topics suitable for credit transfer.

A 'Learning Chains' table may include a list of learning chains created by, or populated for, learners and other users. Each learning chain may be referenced by the courses, topics, sub-topics etc. of the learning chain.

'Educator' tables may be used to list educators (e.g. lecturers, teachers, tutors), and be referenced by sub-topics the educator is involved with. Relevant educator sub-topic attributes may relate to, for example, outstanding tasks such as responding to student enquiries or marking papers.

A 'Users' table provides basic user information for all users (e.g. learners, educators, institutions, workplaces), for example, each user's name, address, telephone number, social media or messaging account details, etc.

Where many-to-many relationships exist between each table, for example between the 'Topics' table and the 'Courses' table or between the 'Courses' table and the 'Careers' table, junction tables may be used to map two or more tables together, by referencing the keys associated with each data table.

The user's computer 102 accesses the above relational database in order to automate or generate learning chains, as well as populate dashboards relating to learner performance and material.

The above table descriptions provided by way of example only, and the person skilled in the art will appreciate that a suitable relational database may be implemented in many different ways. For example, the relational database may include an address embedded within the data of the rows and columns of a table that specifies the location of data in the one or more tables.

Figure 2:
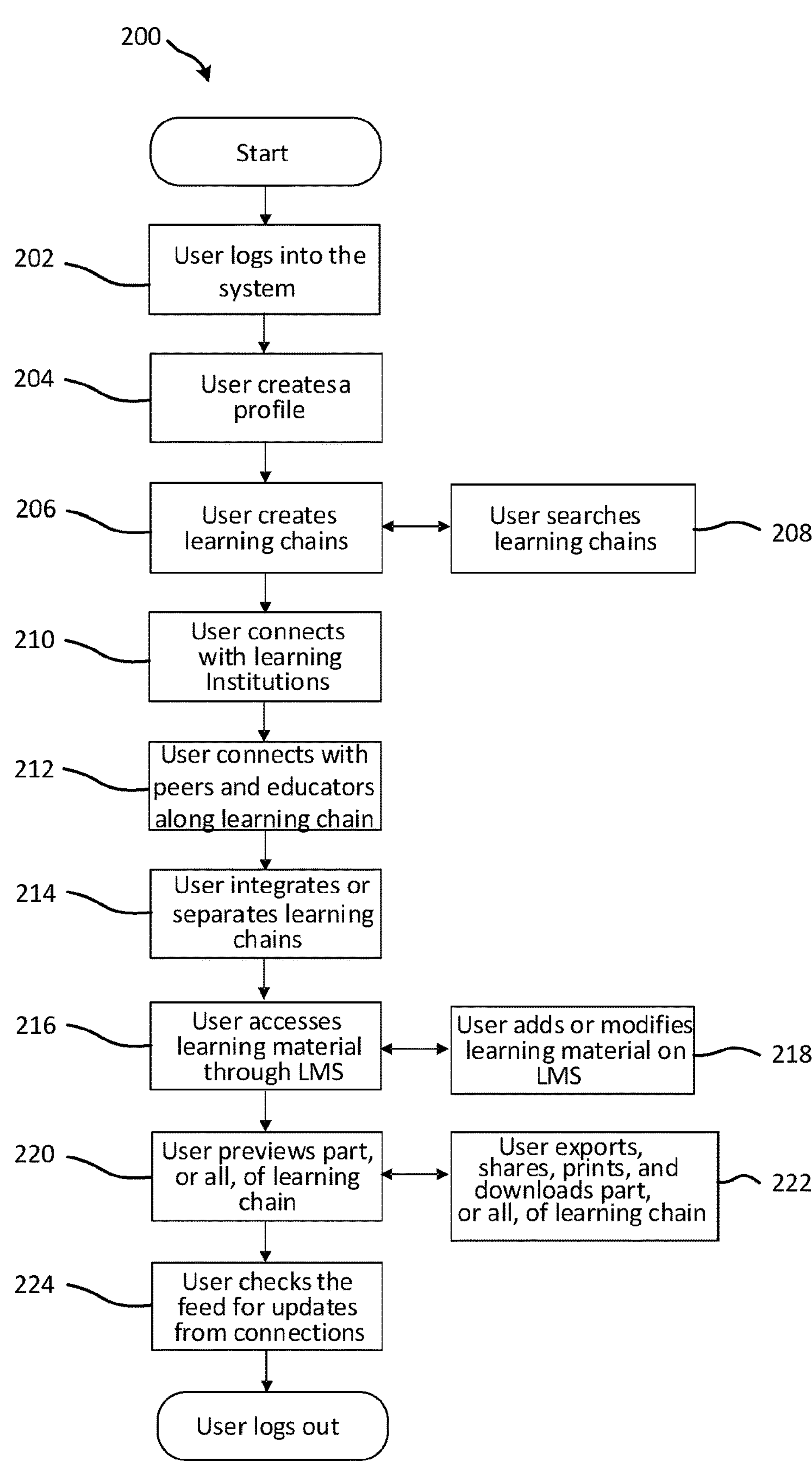
FIG. 2 is a flowchart diagram of an Internet-based learning network according to one embodiment.

Referring to FIG. 2, there is shown a flowchart diagram 200 of a system for an internet-based learning network according to one embodiment. First, a user logs 202 onto the system 100. Then, the user creates a profile 204 and creates learning chains 206. Alternatively, the user can search for existing learning chains 208 prepared by other users. In addition, the user connects with learning institutions 210 to check their learning chains regularly as well as connects with peers and educators 212 along the same learning chain who share the same interests. The user has the option to integrate 214 learning chains into one chain or separates learning chain into multiple chains. The user accesses learning material and communication tools 216 through the LMS at each node or collection of nodes. Moreover, the user could add or modify 218 learning material and save communications on the LMS. Furthermore, the user could preview 220 part of or all learning chain to preview 222, share, download, print or export as a link, PDF, image, etc. The user checks updates from first, second and third degrees of connections on the user's feed 224.

Figure 3:
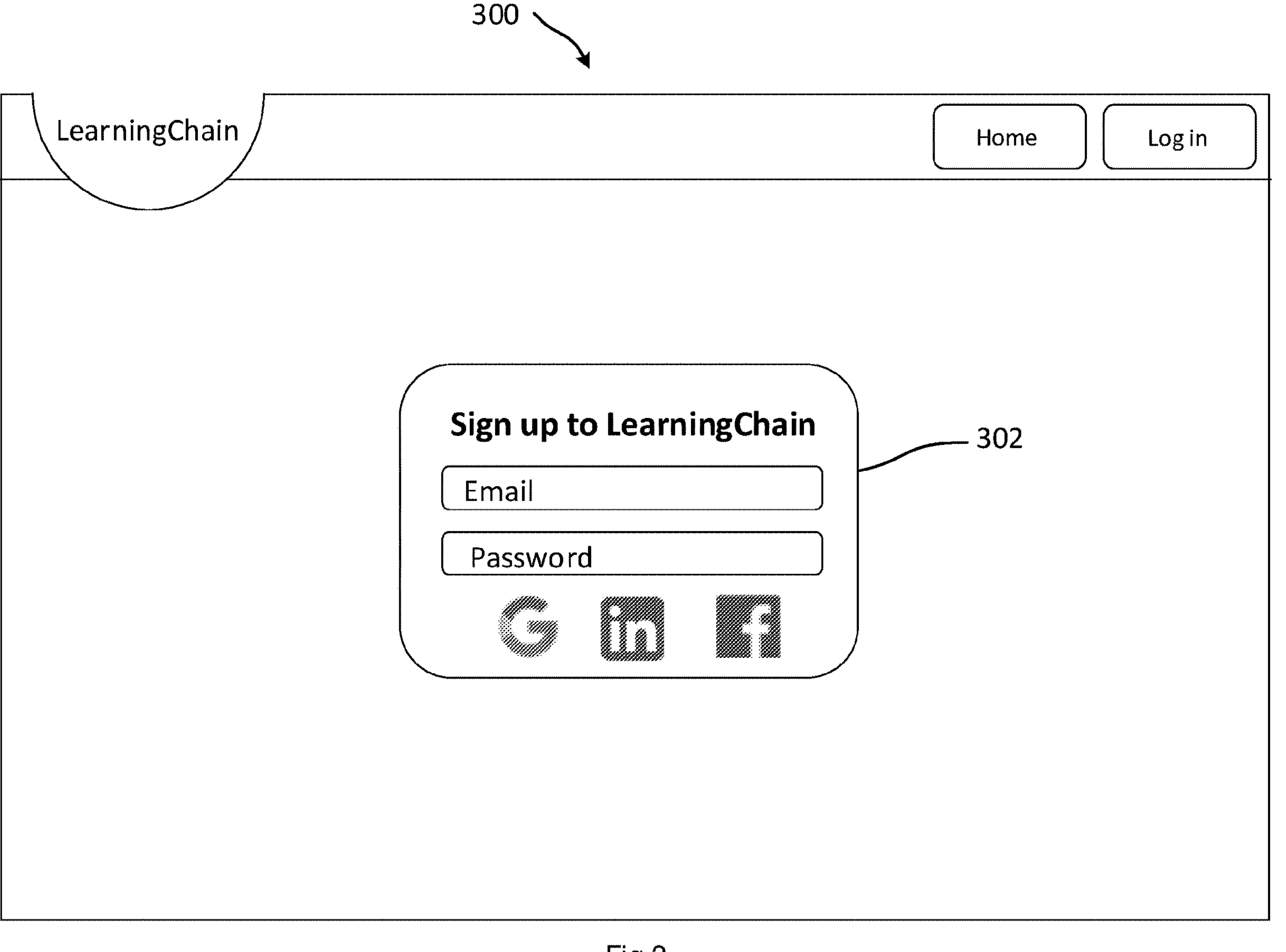
FIG. 3 is a screenshot of a user login interface useful for the system of FIG. 1.

Referring to FIG. 3, there is shown a screenshot of a user login screen which is useful for the system of FIG. 1. As can be seen in this embodiment, a user enters a registered email address and a password to access the system 100. Users have the option to login using other methods, such as Google®, Facebook® or LinkedIn® login information.

Figure 4:
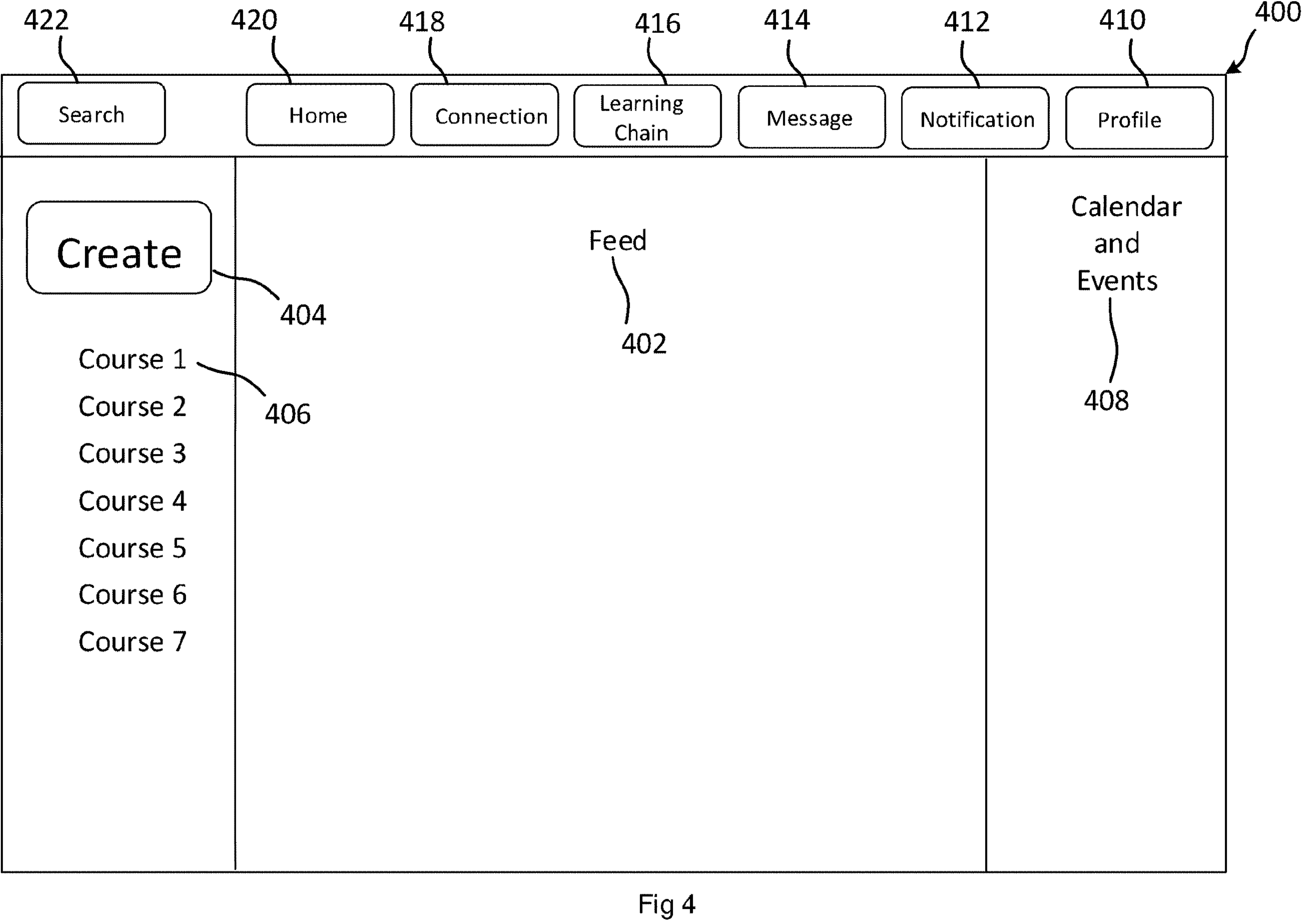
FIG. 4 is a screenshot of a user's homepage.

Referring to FIG. 4, there is shown a screenshot of an environment 400 that is defined by console frames that surround the application areas. After logging into the system 100, the user is presented with a user interface that includes the feed 402 that shows the activities of connections that are updated regularly, in each user's feed, an algorithm is used to show learning material to the topic a user is currently learning as well as the pre-requisite material and subsequent material. There is also create learning chain 404 in which a user creates a new learning chain, the enrolled courses 406 that shows all courses a user is enrolled in, completed, or created appears on the left, a user's calendar and events 408 to remind the user of events and deadlines. There is a console top that includes a user's profile 410 that shows the basic information of the user and activities, a user's notifications 412 that includes alerts for interactions with user's activities, a user's messages 414 that includes all communication between this user and other users, a user's learning chains 416 that includes all the learning chains of this user related to learning institutions or independent learning, a user's connections 418 that include peers, educators and learning institutions, home 420 which is the landing homepage a user reaches when first login and search option 422 that allows a user to search for learning chains of learning institution, peers, educators, and other users.

Figure 5:
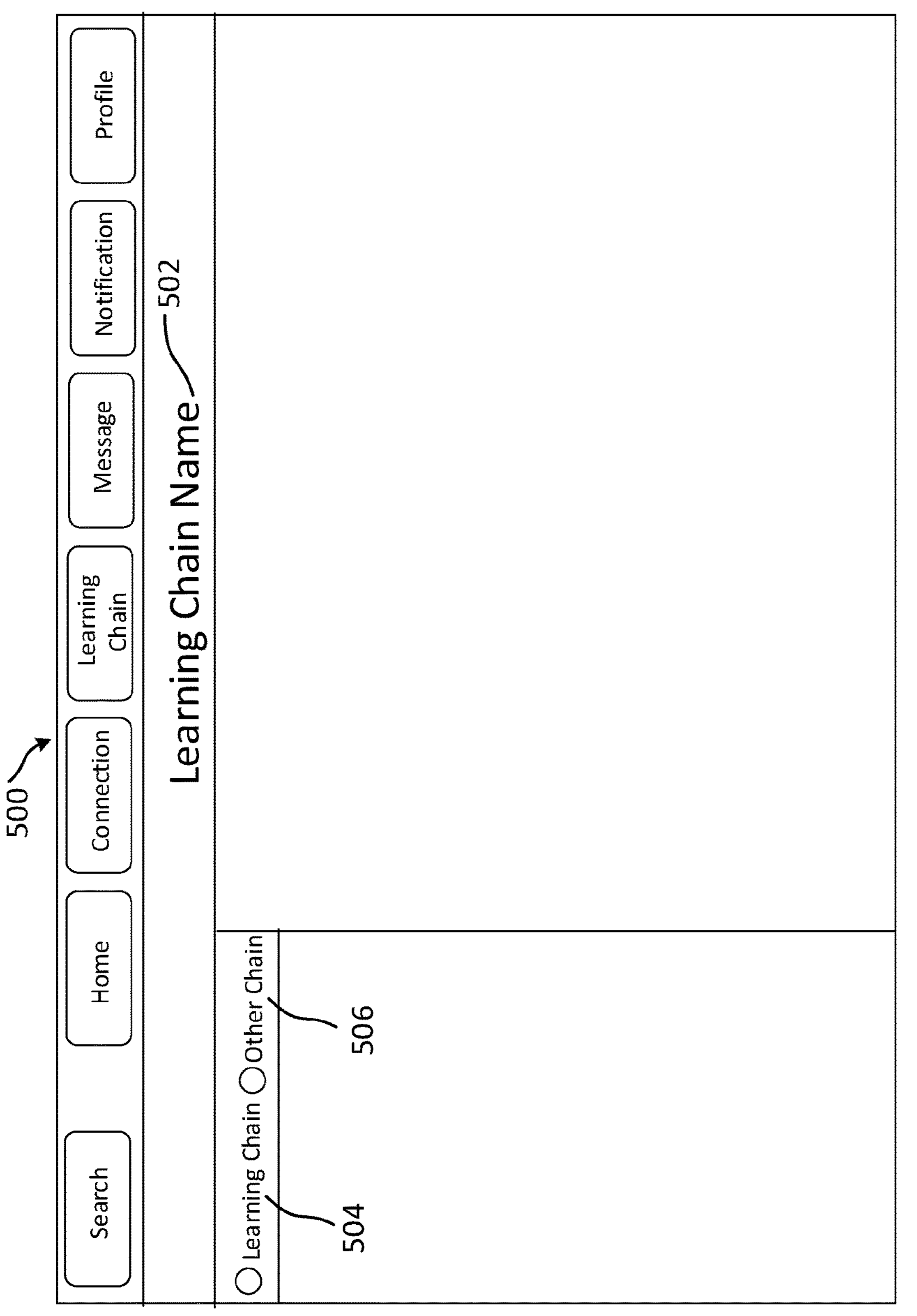
FIG. 5 is a screenshot of creating a learning chain pertaining to FIG. 4.

Referring to FIG. 5, there is shown a screenshot of creating a learning chain 500. The user gives a name to the new learning chain 502 or it will be entitled learning chain 10, then a user has the option to create a learning chain using existing fields of study 504 or using customized templates 506 to create a chain for learning or other activities such as a chain for job description, a chain of medicine, etc. It is preferable that learning institutions use the platform chain (existing fields of study 504) in order to be comparable for credit transfer and used by wide scale, however, any institution can build a separate chain by themselves (using customized templates 506). Learning chains could be customized and personalized to fit the users' needs. Learning chains are dynamic in which each chain is animated to show turn by turn navigation displaying how a chain starts and develops. Learning chains have an interactive interface in which you move on a node to highlight and click it to access the chain of this node only, however, a user could zoom in to check the subnodes of this node and other nodes as well as along the chain. Learning chains could be displayed using desktops, laptops, iPads, smartphones, augmented reality (AR), mixed reality (MR) and virtual reality (VR). In addition, Learners could search for learning chains using voice navigation tool.

Figure 6:
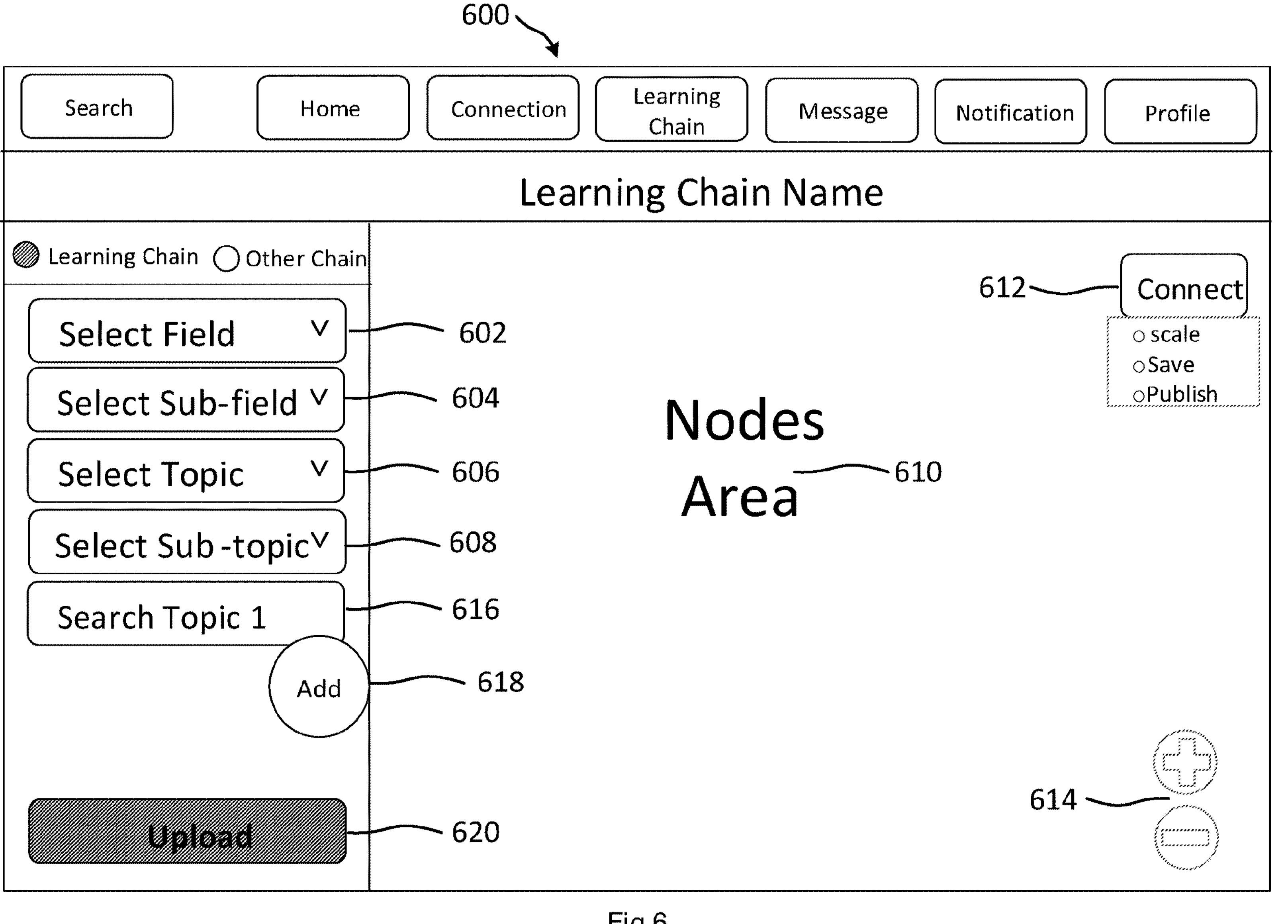
FIG. 6 is a screenshot of creating a learning chain using existing fields of study.

Referring to FIG. 6, there is shown a screenshot of creating a learning chain using existing fields of study 600. Once a user chooses to create a learning chain from existing fields of study 504, the user chooses the major field of study 602 from a dropdown list, then selects the subfield of study 604 from a dropdown list, then selects a certain topic 606 from a dropdown list and finally selects subtopic 608 from a dropdown list. All sub-subtopics are displayed in the nodes area 610 that is a friendly drag and drop space in which a user connects 612 the sub-subtopics in a logical sequence based on the user's preference, the user could rearrange, add, delete, etc. some nodes, afterwards the user presses scale to fit the learning chain in the provided space. A user could select a certain topic and all subtopic nodes will be displayed on the node's area in which the user could connect them, the user could press zoom in to check the sub-subtopics of nodes and zoom out to check the major topics 614. Alternatively, a user could search for a certain topic 616 instead of checking from the dropdown list then press add 618 in order to be added in the node's area 610 in which a user could connect topics/subtopics 612 and zoom in/out 614. In addition, choose topic then connect the nodes. If a user is willing to add another topic, then the user searches for the new topic in the search bar 616 and press add 618 in order to be included in nodes area 610 besides previously added topics. In addition, a user could upload 620 a table of contents, course outline or a chapter, . . . etc. and the platform using a certain machine learning algorithm will scan the document and propose a learning chain in which a user could modify, add and/or delete nodes. This will save a lot of time for users and it is efficient producing learning chains from existing documents. Furthermore, a learner could search existing learning chains for comparison or use the platform's fully automated AI software for the most suitable learning chain for that user based on the user's previous learning experience. This is done in seconds, saving a user time and delivering a tailored learning chain for each user.

Figure 7:
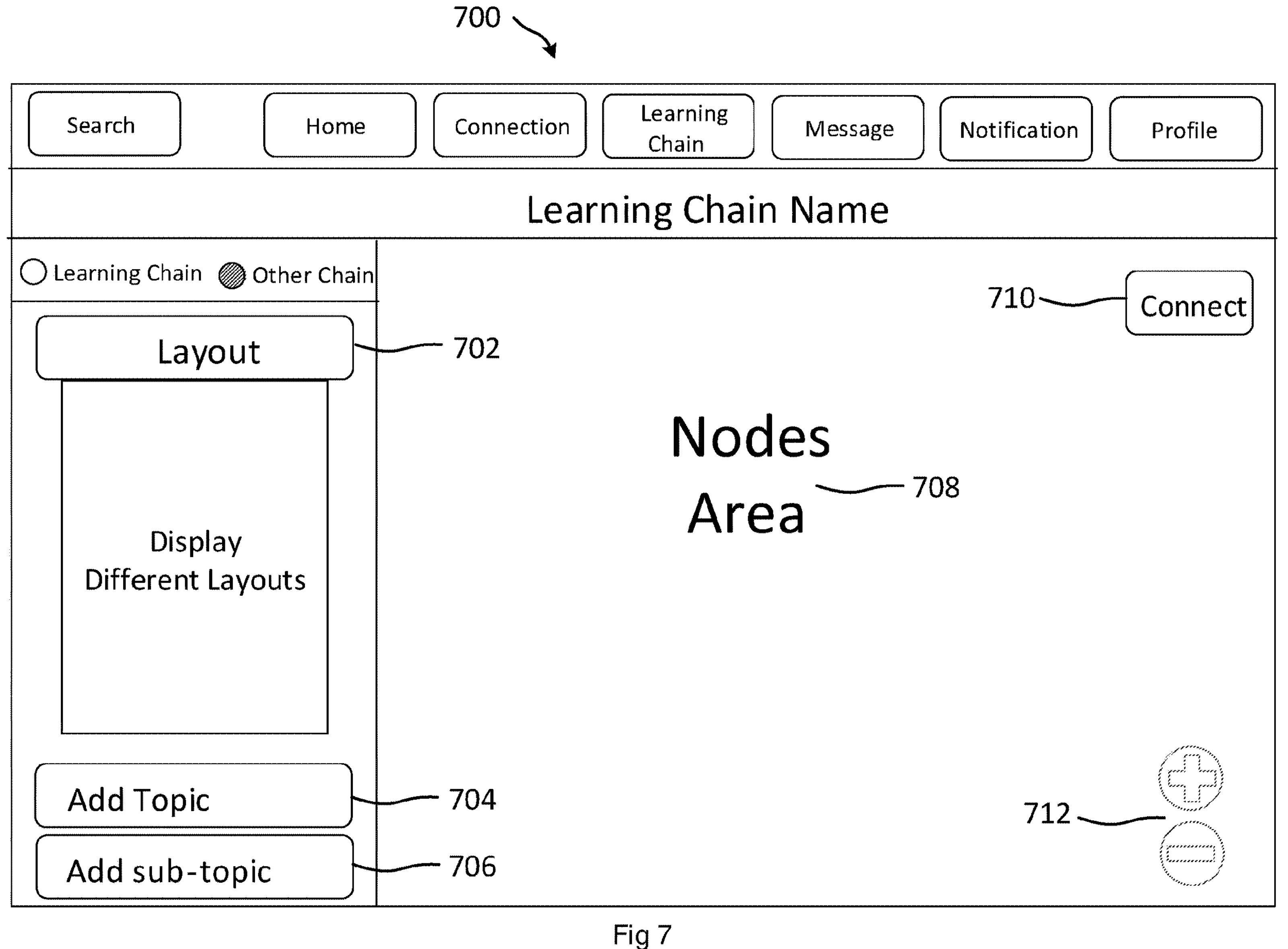
FIG. 7 is a screenshot of creating a tailored chain using customized layouts.

Referring to FIG. 7, there is shown a screenshot of creating a tailored chain using some layouts 700. The repository 106 of customized templates 702 comprises a plurality of design resources. Additional design elements can be interfaced to the design interface 700 from an outside resource or outside repository from a third party and can be integrated into the system 100. The layout customization module comprises instructions executable on the processor for changing various options of a selected template. This is useful for the user to create a plurality of options for review and feedback. A user wants to create a tailored chain so the user presses other chain 506 in which a user has the option to choose a design template from existing layouts 702 and then modify the template. Alternatively, a user could create his own template by pressing add topic 704 in which a node is displayed in the node area 708. A user could repeat the same step by creating another node(s) 704 then connect all nodes in a rational sequence 710. A user could add subtopics to existing topics by highlighting existing topic node then press add sub-topic 706 in which one or many sub-nodes will be included in the main node and the user connects 710 them in an eloquent sequence and could zoom in/out 712 to check the sub-nodes or main nodes. Chains have a significant degree of customization with many interactive customizable templates, once a node is pressed, it is directed to a personalized template of this node and so on.

Learning chains would be applied by schools, colleges, universities, institutions, and company to enhance learning organization culture. There are broad applications for learning chain in addition to learning. Learning chains could be used in pharmaceutical industry, linking medications together in a chain to see which medicine is a pre-requisite for another medicine, which medicine is a core-requisite for another medicine that must be consumed together, and which medicine is an anti-requisite that cannot be consumed with another medicine. Also, it could be used in the medical field, what are the shared symptoms of diseases and what additional symptoms distinguish one disease from another.

Figure 8:
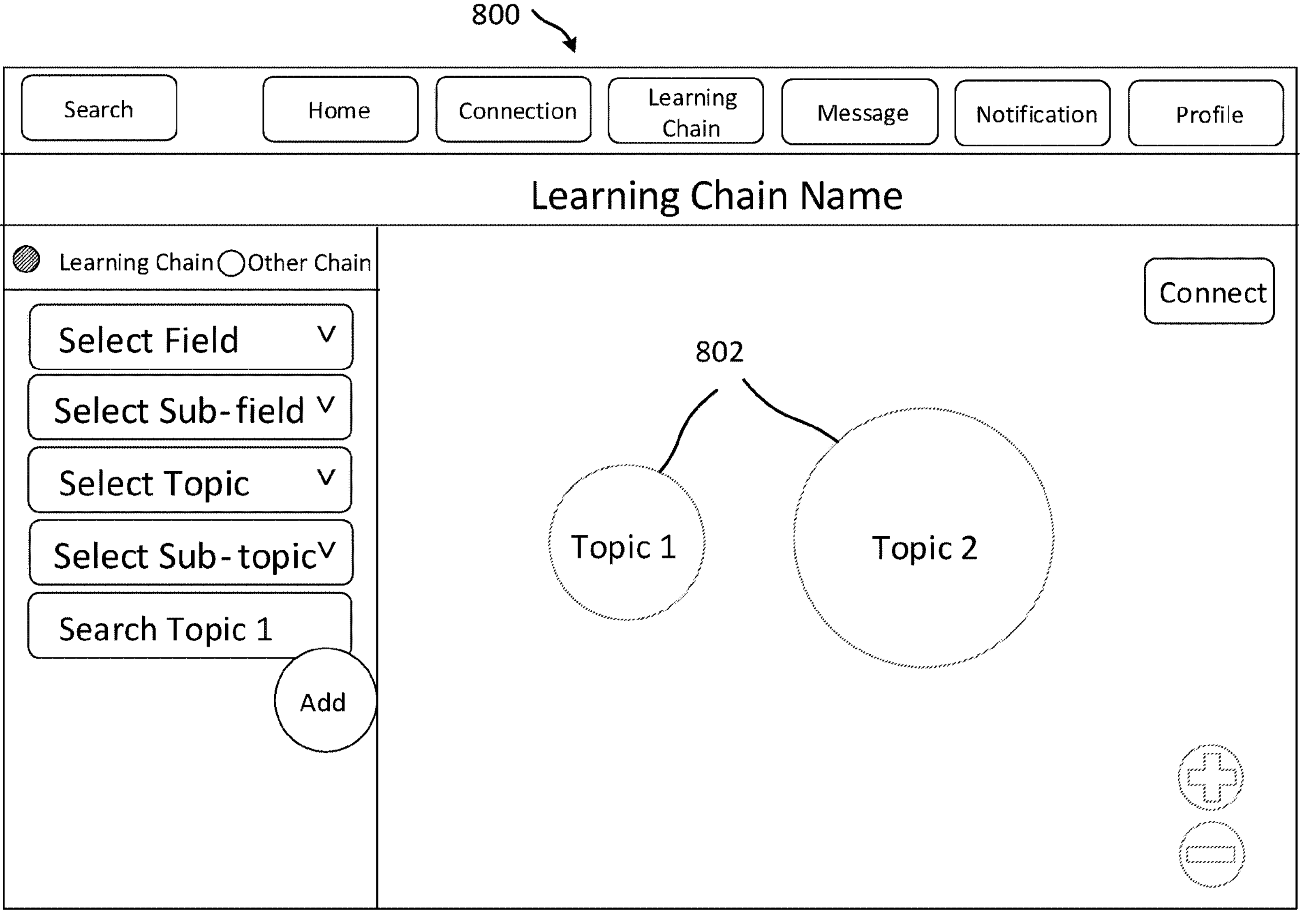
FIG. 8 is a screenshot of comparing the size of nodes.

Referring to FIG. 8, there is shown a screenshot of comparing the size of nodes 800. Once a user created a learning chain 600, each node is composed of sub-nodes that is composed of sub-sub-nodes and so on in order to provide a greater level of anatomy. The size of each node is proportionate to the number of topics/subtopics, a bigger node means a higher number of sub-topics. For example, by comparing the size of nodes 802, topic 2 has more subtopics compared to topic 1.

Figure 9:
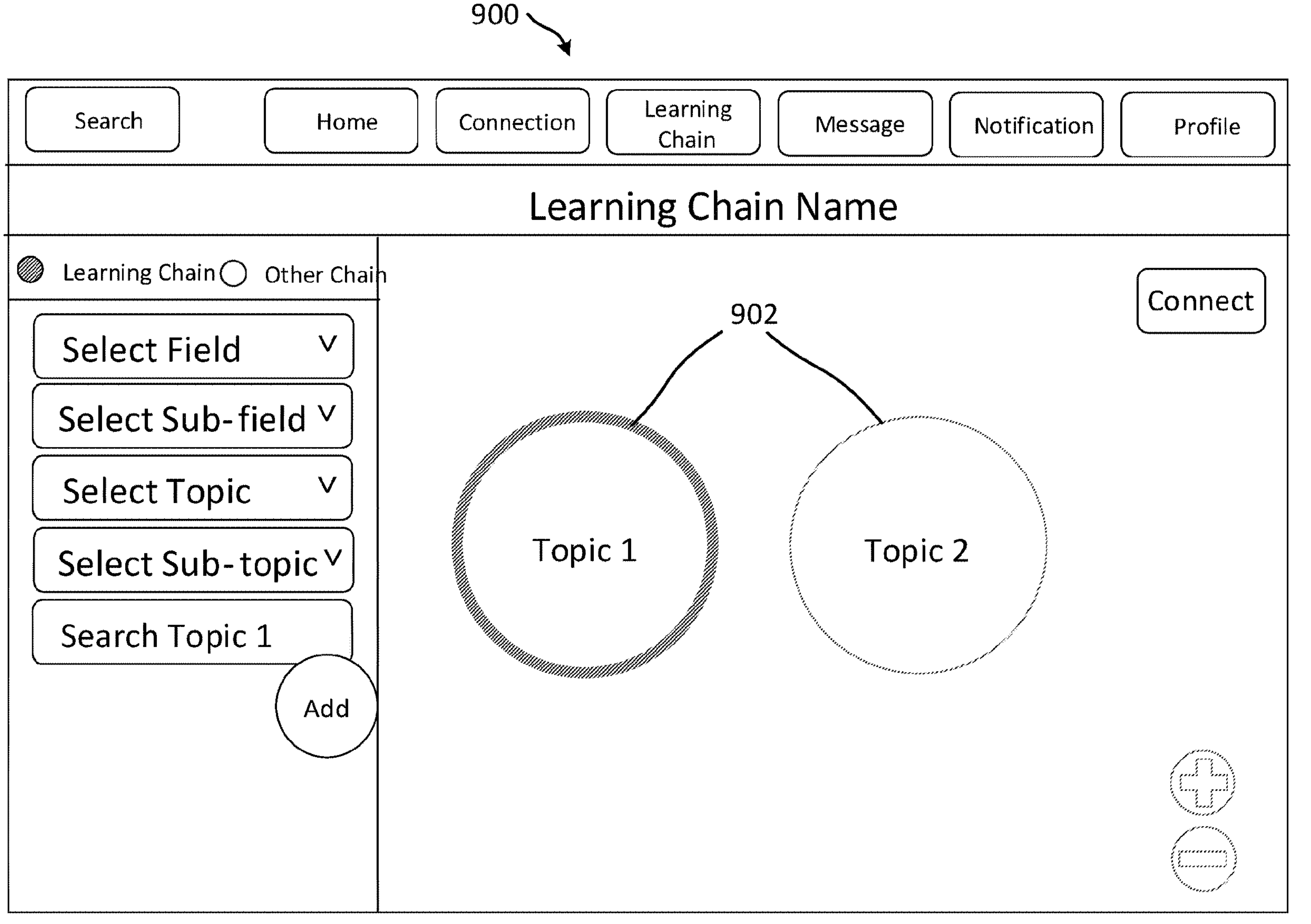
FIG. 9 is a screenshot of comparing the connections of nodes.

Referring to FIG. 9, there is shown a screenshot of comparing the connections of nodes 900. Once a user created a learning chain 600, each node is connected with other nodes in order to display the learning network and sequence of ideas. The border of each node reflects the number of connections, a thicker border means more connections. For example, by comparing the connections of nodes 902, topic 1 has more connections compared to topic 2 as evidenced by a thicker border. It is also noted that topic 1 and 2 have the same number of subtopics which is reflected in equal node size.

Figure 10:
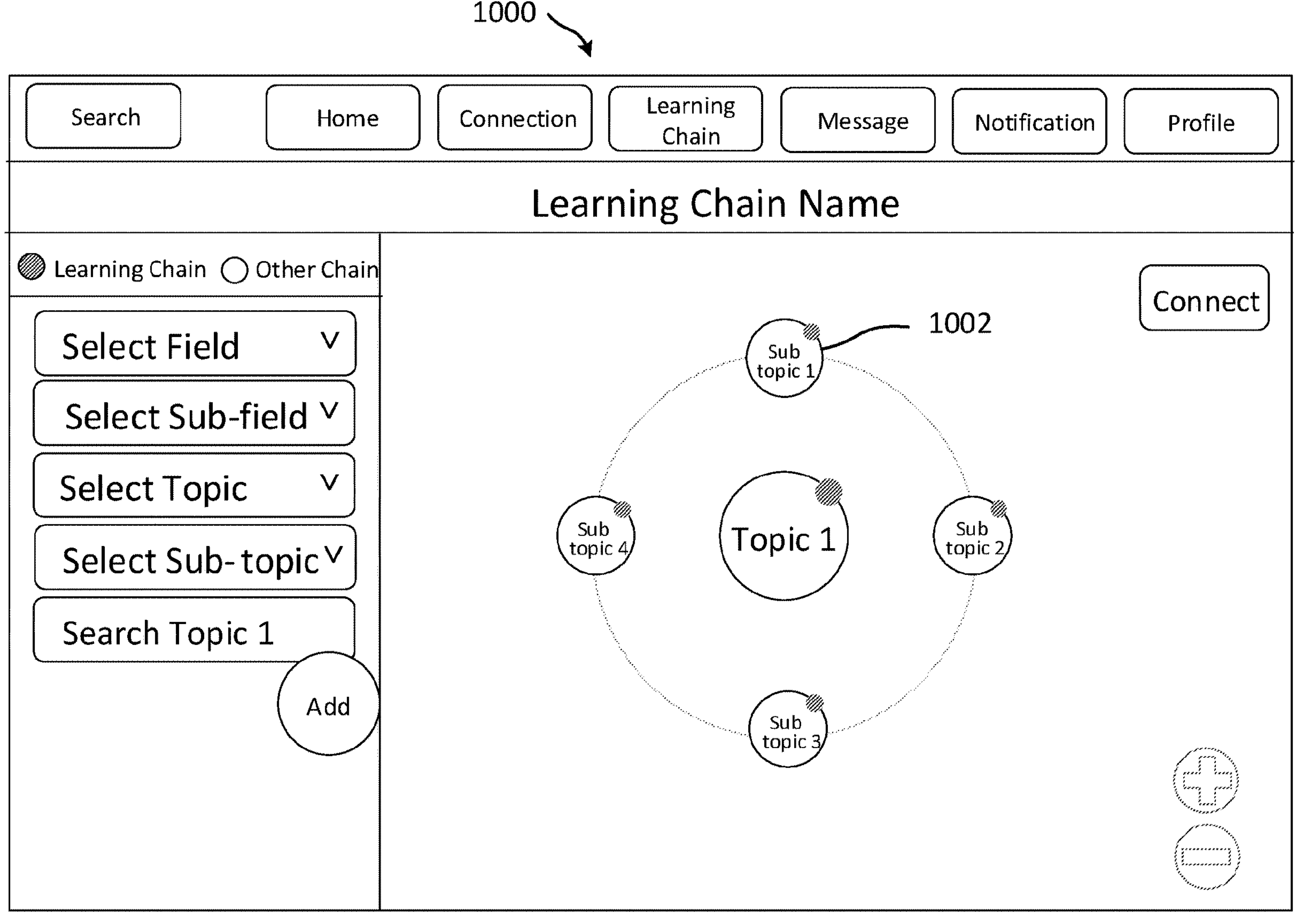
FIG. 10 is a screenshot of an LMS attached to a node.

Referring to FIG. 10, there is shown a screenshot of an LMS attached to a node 1000. Each node has an LMS that is available as a small circle at the top right of the node. Learners press an LMS to access all learning material related to a certain topic (such as study notes, PowerPoint slides, excel files, images, codes, links, book chapter, videos, audio, etc.) provided by learning institution/learner. An LMS is available at each node and collection of nodes. Sometimes there is a comprehensive case study that is related to multiple nodes so all these nodes are gathered together under one large node and this node has an LMS that includes learning material that reflects all these nodes while each node has its own LMS that is accessible as well. For example, by checking the learning chain 1002, it is obvious that subtopic 1, 2, 3, and 4 have learning material or communication as shown by LMS on the top right of these nodes. It is also noted that there is an LMS for topic 1 which is composed of the four subtopics that includes comprehensive learning material based on all the four subtopics.

Figure 11:
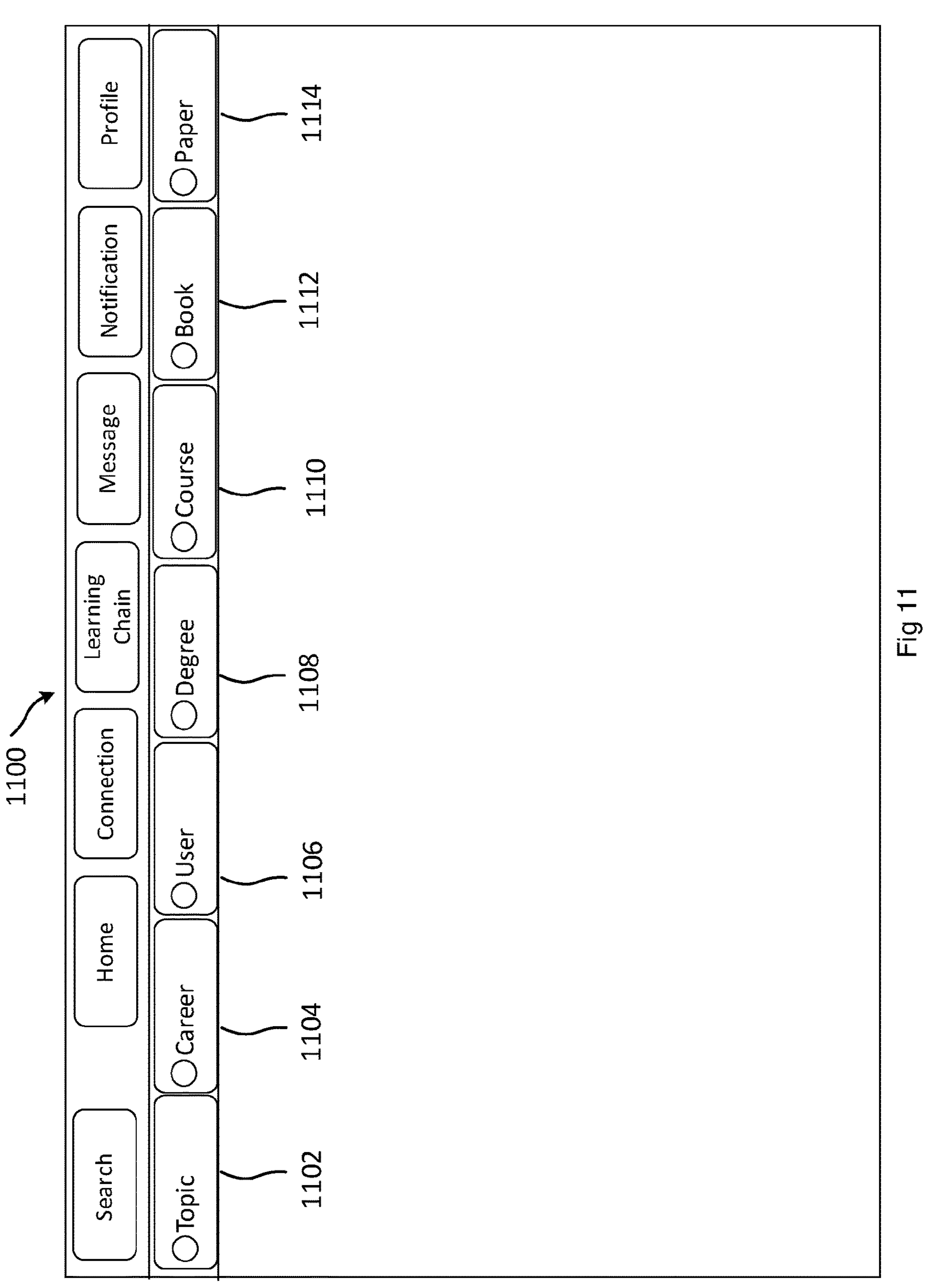
FIG. 11 is a screenshot of searching learning chains pertaining to FIG. 4.

Referring to FIG. 11, there is shown a screenshot of searching learning chains 1100. A user searches learning chains using different search criteria. A user could search by a topic 1102 to check different learning chains provided by learning institutions/users. A user could search by a career 1104 to check different learning chains that lead to a certain job. A user could search by a user 1106 to connect with educators, peers, learning institutions and industry professionals to access its learning chains. A user could search by a degree 1108 to check different learning chains related to a certain degree provided by different learning institutions. A user could search by a course 1110 to check different learning chains related to a certain course provided by different learning institutions. A user could search by a book 1112 to check the learning chain of chapters and topics within this book. A user could search by a paper 1114 to check the learning chain of topics within this paper and what are the prerequisite topics/subtopics to understand this paper.

Figure 12:
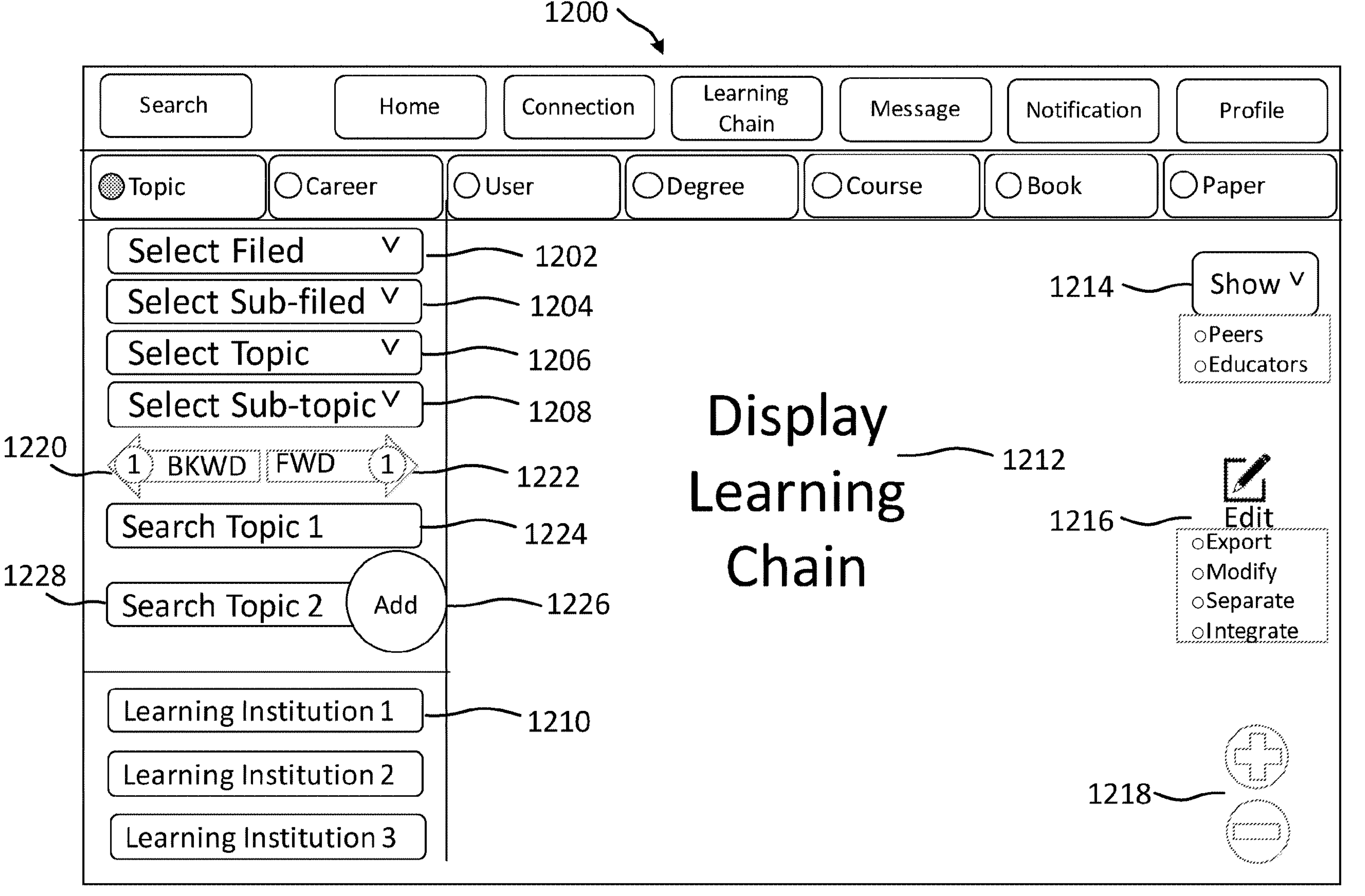
FIG. 12 is a screenshot of searching learning chains for a certain topic.

Referring to FIG. 12, there is shown a screenshot of searching learning chains for a certain topic 1200. If a user selects a topic 1102 as a selection criterion, a user chooses a certain field of study 1202 from a drop list menu, then selects subfield of study 1204 from a drop list menu, then selects topic 1206 from a drop list menu, then selects subtopic 1208 from a drop list menu, a list of learning institutions/users 1210 that have learning chain for this topic is displayed. A user can select one or more learning institutions/users to compare their learning chains, each chain will be displayed using a different color code, learning institutions are displayed based on a user's first, second and third degrees of connections. Once selected, the learning chains of this topic are displayed in the nodes area 1212. A user could repeat the previous steps to add another topic and check the connection between these topics by displaying their learning chains. A user has the option to show connections 1214 in order to display educators and peers at each node. A user could edit learning chain 1216 in order to export the learning chain or part of it as PDF, image, link, etc. the user could modify, separate or integrate learning chains and it will be exported in user's learning chain section. A user could zoom in/out 1218 in order to check subtopics or major topics. a user could press backward learning chain 1220 in order to access the previous topics on the selected chain and a user could be press forward learning chain 1222 in order to access the next topics on the selected chain. A user could go one step or multi-steps backward or forward as displayed in the number beside BKWD or FWD. Instead of using a dropdown list, alternatively, a user could search for a certain topic 1224 and a list of learning institutions will be displayed 1210 in order to select one or many to display their learning chains. A user could press add 1226 in order to add another search topic 1228 to see the connections of the selected topics, a user could add other topics as well and so on.

Figure 13:
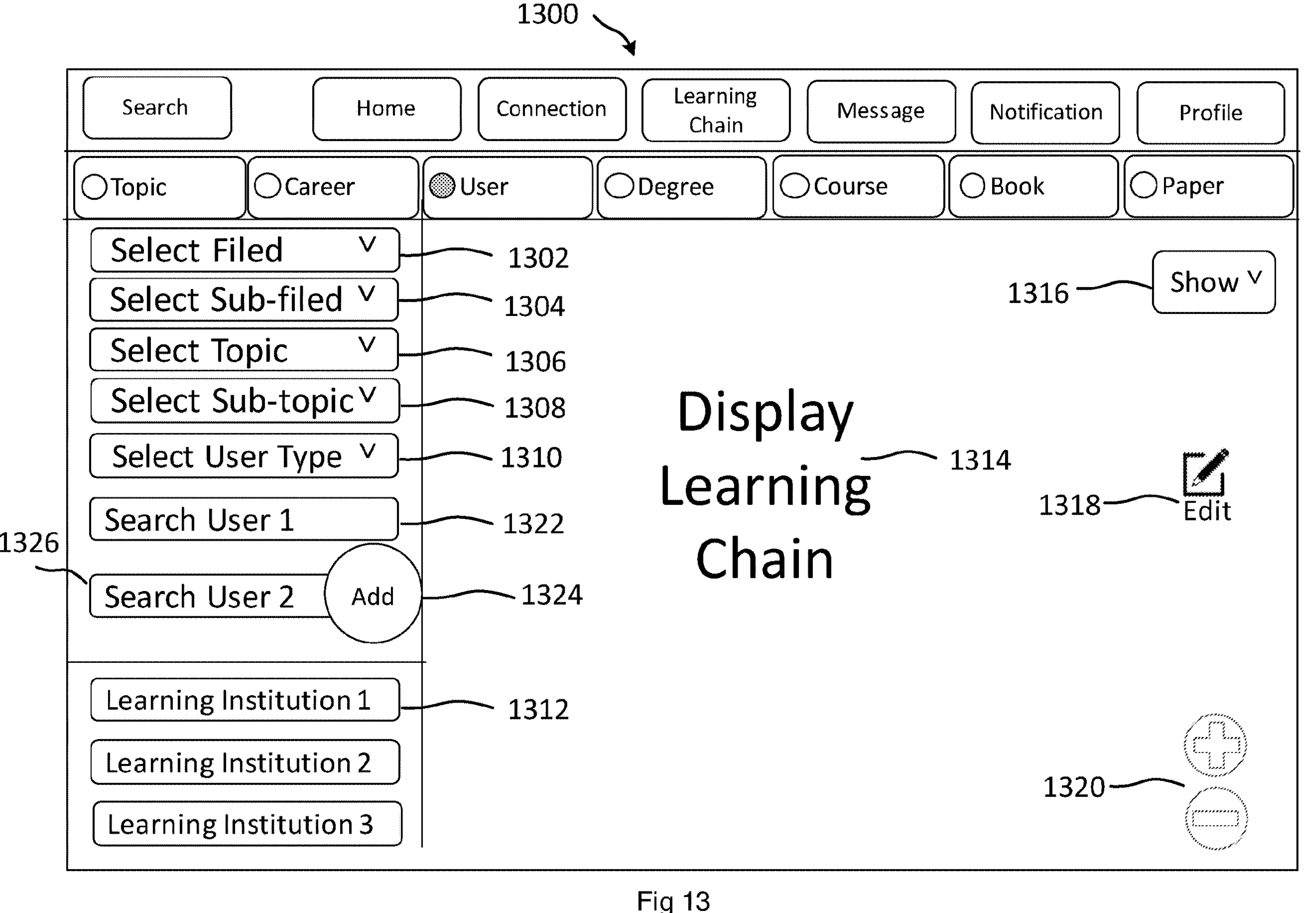
FIG. 13 is a screenshot of searching learning chains for a certain user.

Referring to FIG. 13, there is shown a screenshot of searching learning chains using a certain user 1300. If a user selects a user 1106 as a selection criterion, a user could repeat the same steps as in 1200 to select field 1302, sub-field 1304, topic 1306 and subtopic 1308, then a user selects the user type 1310, such as educator, learning institution or other users. Once selected a list of different users are displayed 1312. It is possible to select one or more users to compare their learning chains, each chain is displayed using a different color code. Once selected, the learning chains of these users are displayed in the node zone 1314. A user has the option to show institutions, for example of a selected educator or industry professional 1316 as stored in the database 106. A user could edit a learning chain 1318 in order to export the learning chain or part of it as PDF, image, link, etc. the user could modify, separate or integrate learning chains and it will be exported in user's learning chain section. A user could zoom in/out 1320 in order to check subtopics or major topics. Alternatively, a user could search for a certain user 1322 without using the drop list and a list of users will be displayed 1312 in order to select one or many to display their learning chains. A user could press add 1324 in order to add another search user 1326 in order to compare between two or more users using their learning chains.

Figure 14:
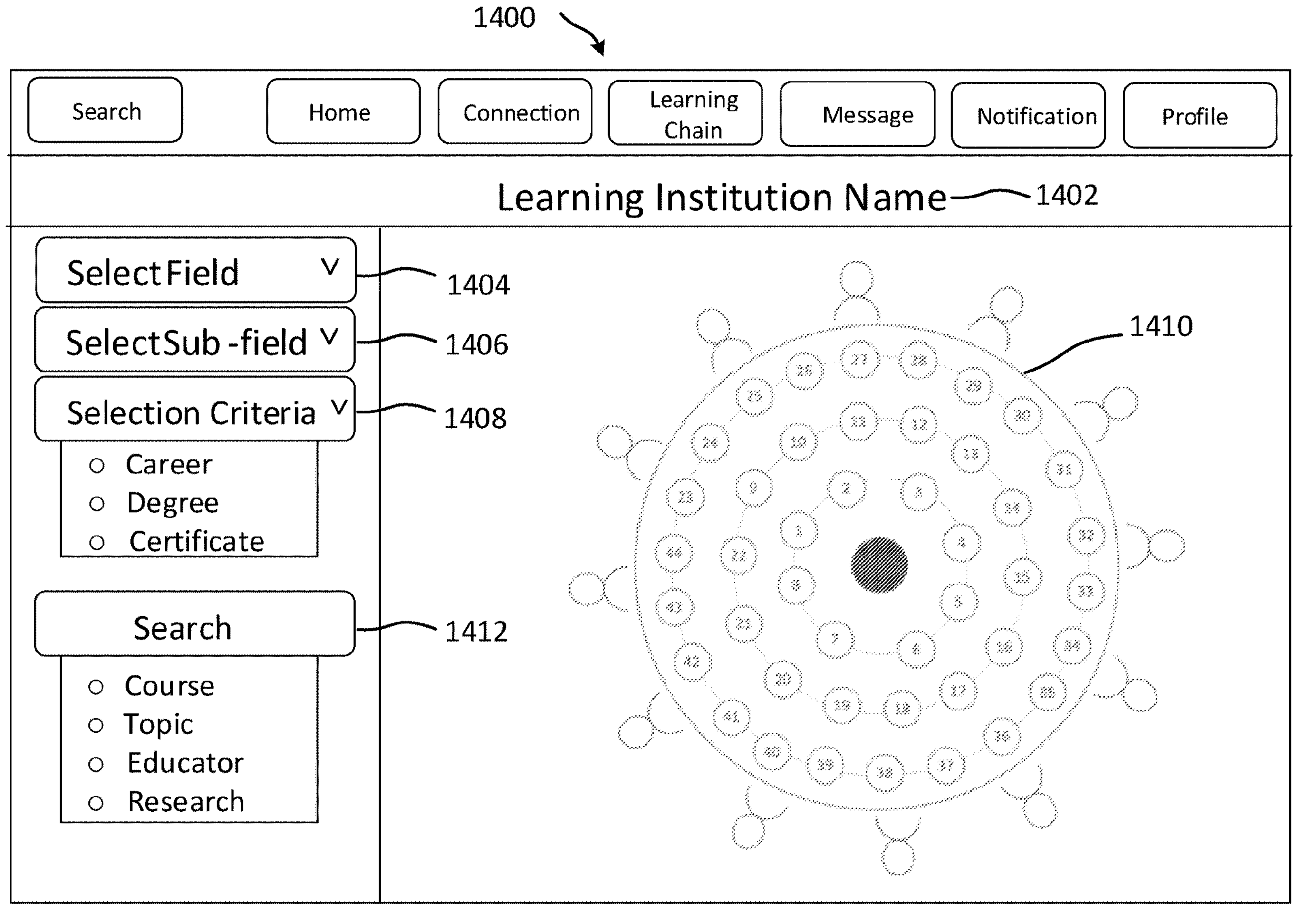
FIG. 14 is a screenshot of accessing learning chains of learning institutions.

Referring to FIG. 14, there is shown a screenshot of accessing learning chains of learning institutions 1400. If a user selects a learning institution 1108 as a selection criterion and a user selected a certain learning institution to display its learning chains. Learning institution's name 1402 is displayed on the top. A user selects a certain field of study 1404 from a dropdown list, then a user selects a certain subfield of study 1406 from a dropdown list and a user selects a certain criterion 1408 from a dropdown list to select the learning chain based on employability or degree or certificate. For example, a user selects career as a selection criterion so different careers and their courses are displayed in the display area 1410. Furthermore, a user could search using other criteria 1412 such as course, topic, educator or research.

Figure 15:
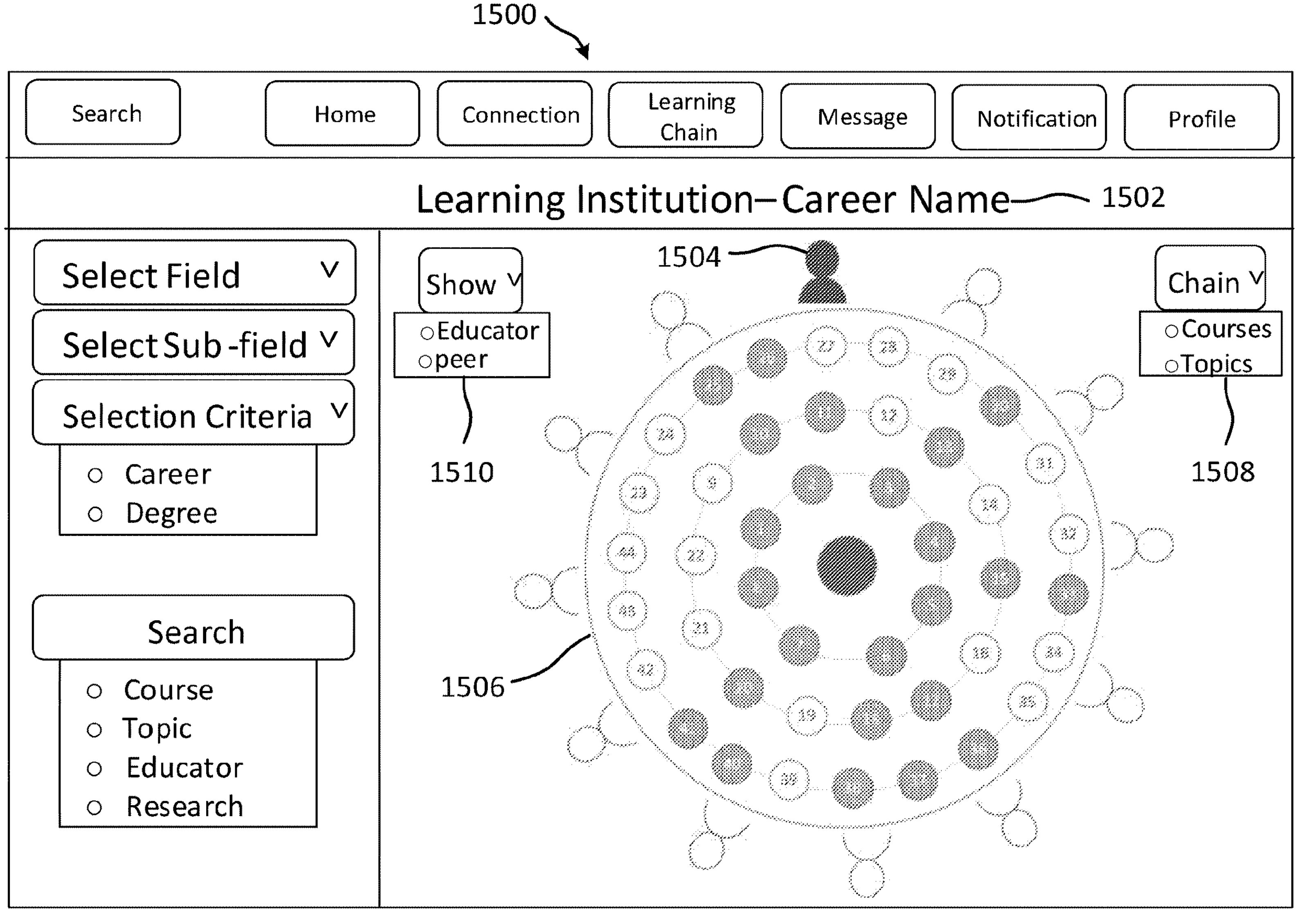
FIG. 15 is a screenshot of searching an institution's learning chains for a certain career.

Referring to FIG. 15, there is shown a screenshot of searching institution's learning chains for a certain career 1500. If a user selects a career 1408 as a selection criterion, different careers and their assigned courses are displayed in the display area 1410. This is an interactive chain in which a user moves on any of the careers displayed and highlights one of these careers 1504 in order to display the courses that need to be studied to be qualified for this career. Once a certain career is selected 1504, all suggested courses are displayed in the course zone 1506. A user could click a certain career to select it, suggested courses will be active nodes and other courses would be inactive 1506. A user could highlight any course to see the connections with other courses, the prerequisite courses for this course are shown in a connection with a certain color and the core courses for this course are shown in a connection with a different color, and the succeeding courses that require this course as a prerequisite are shown in a connection with a different color. A user could press chain 1508 in order to display the chain of courses and the sequence of learning topics/subtopics. A user could press show connections 1510 in order to display the educators/peers of each course. There is an option in which learners could tailor the degree/certificate based on their needs in which they can select their own courses to get a certain degree/certificate and within each course, learners have the option to choose the topics and subtopics of that course which promotes personalized learning and gives learners the chance to study what they need and what matches their dream jobs. In addition, each node includes the estimated time duration to learn as well as the credit point of each node in which assists learners to form their own courses.

Figure 16:
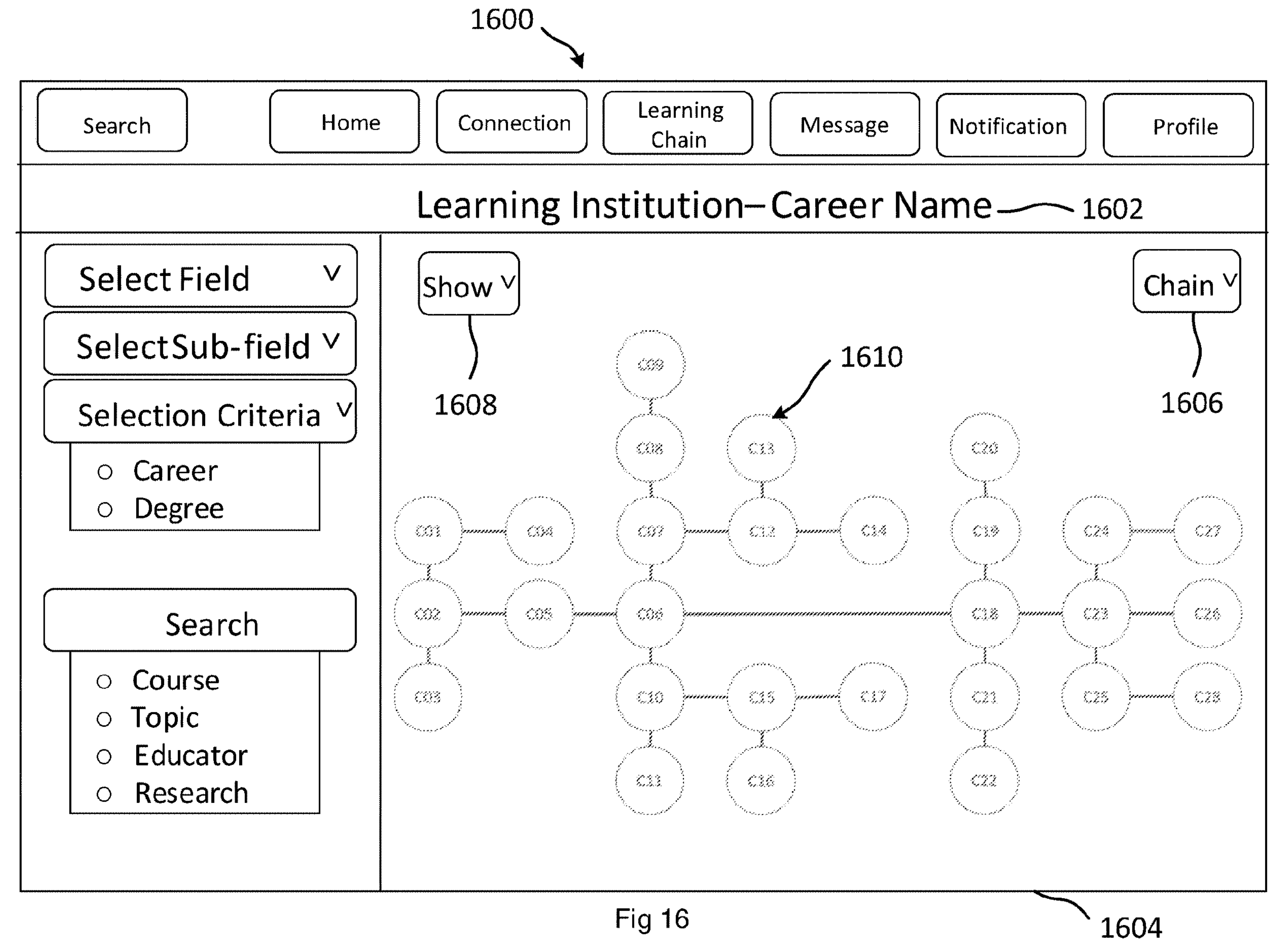
FIG. 16 is a screenshot of a course learning chain for a certain degree/career.

Referring to FIG. 16, there is shown a screenshot of a learning chain of courses for a certain degree/career 1600. Once a certain career is selected 1504 and suggested courses are displayed 1506, a user could press course chain 1508, which opens a new window where the career name is displayed on the top 1602 and the courses chain 1610 are displayed on chain zone 1604. All learning chains are dynamic and interactive in which it shows the start of chain and the sequence of topics until it ends. Major topics could have images to easily identify them. It is possible to show the chain of topics and subtopics 1606 of all courses as well as to display the connections 1608 of educators and peers of each course/topic/subtopic.

Figure 17:
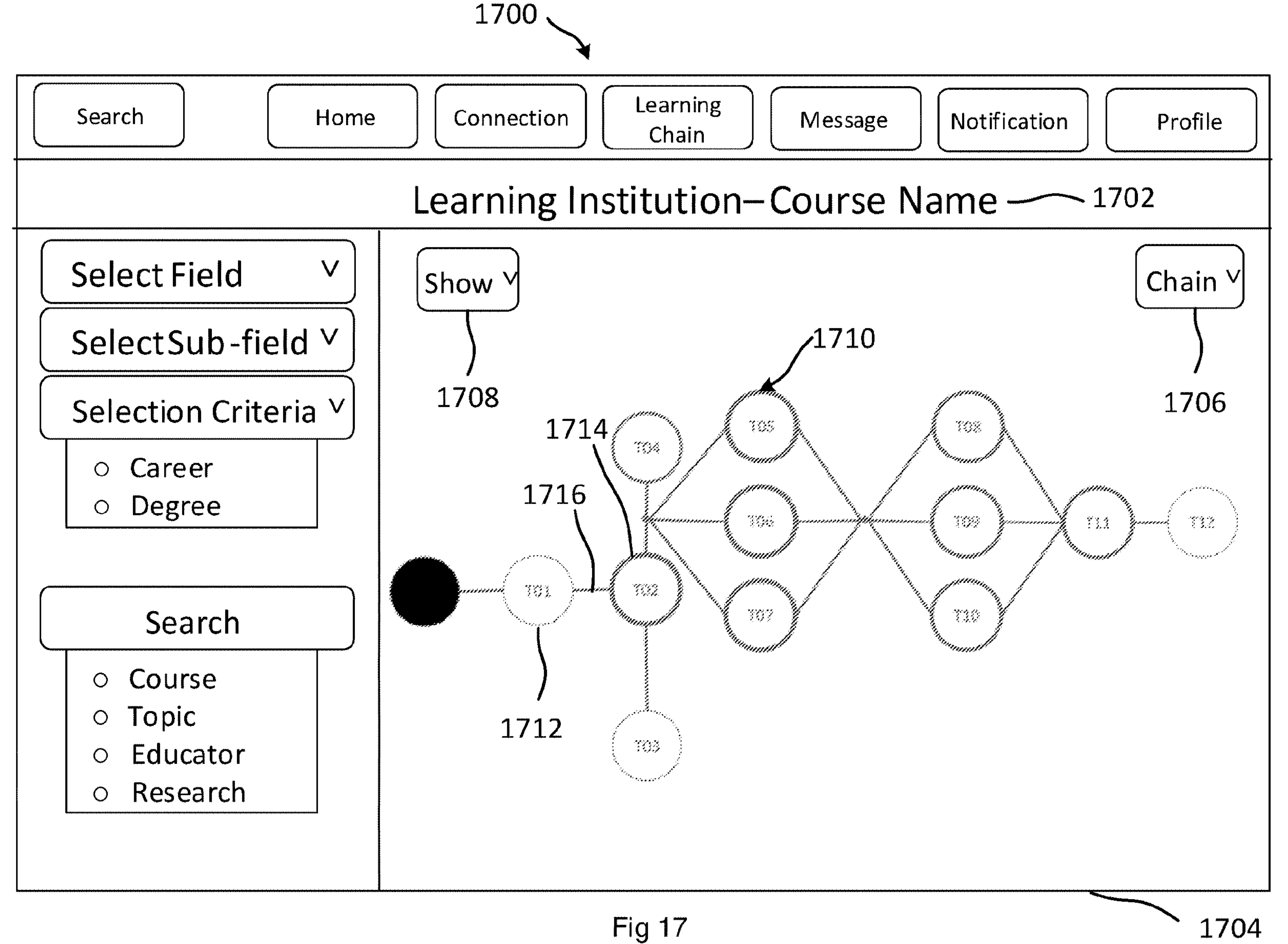
FIG. 17 is a screenshot of a topics learning chain for a certain course.

Referring to FIG. 17, there is shown a screenshot of a learning chain of topics for a certain course 1700. A user could check the learning chain of all topics for all courses 1606 in order to check how all topics are related. Alternatively, a user would prefer to check the topics of a certain course only in which a user presses a certain course on the chain zone 1604, which opens a new window where the course name is displayed on the top 1702 and the topics chain 1710 are displayed on chain zone 1704. It is possible to show the chain of subtopics and sub-subtopics and so on 1706 of all courses as well as to display the connections 1708 of educators and peers of each topic.

Figure 18:
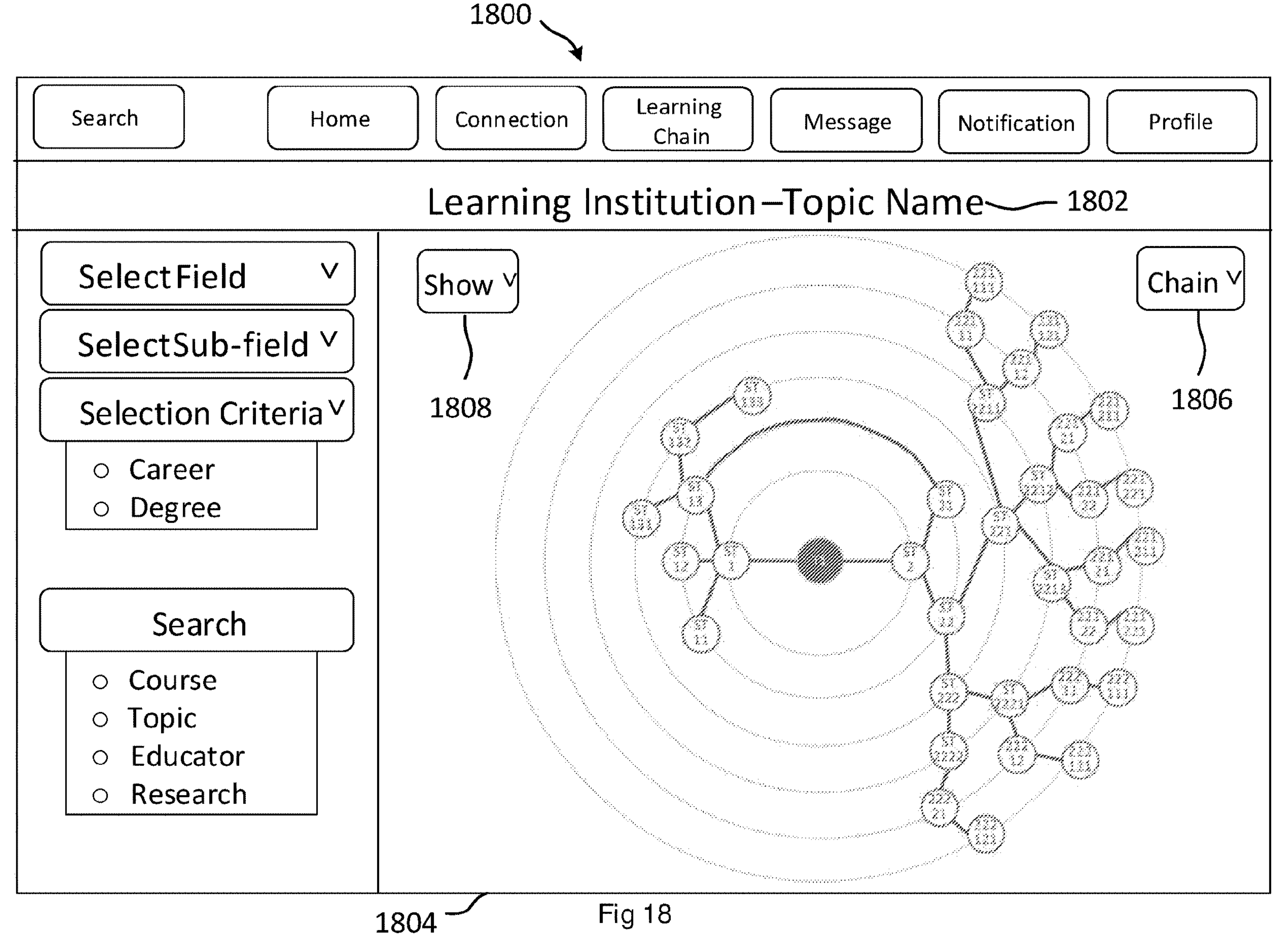
FIG. 18 is a screenshot of a subtopics learning chain for a certain topic.

Referring to FIG. 18, there is shown a screenshot of a learning chain of subtopics for a certain topic 1800. A user would prefer to check the sequence of all subtopics of a certain topic only in which a user presses a certain topic on the chain zone 1704, which opens a new window where the topic's name is displayed on the top 1802 and the subtopics chain is displayed on the chain zone 1804. It is possible to show the chain of sub-subtopics 1806 of all topics as well as to display the connections 1808 of educators and peers of each subtopic.

Figure 19:
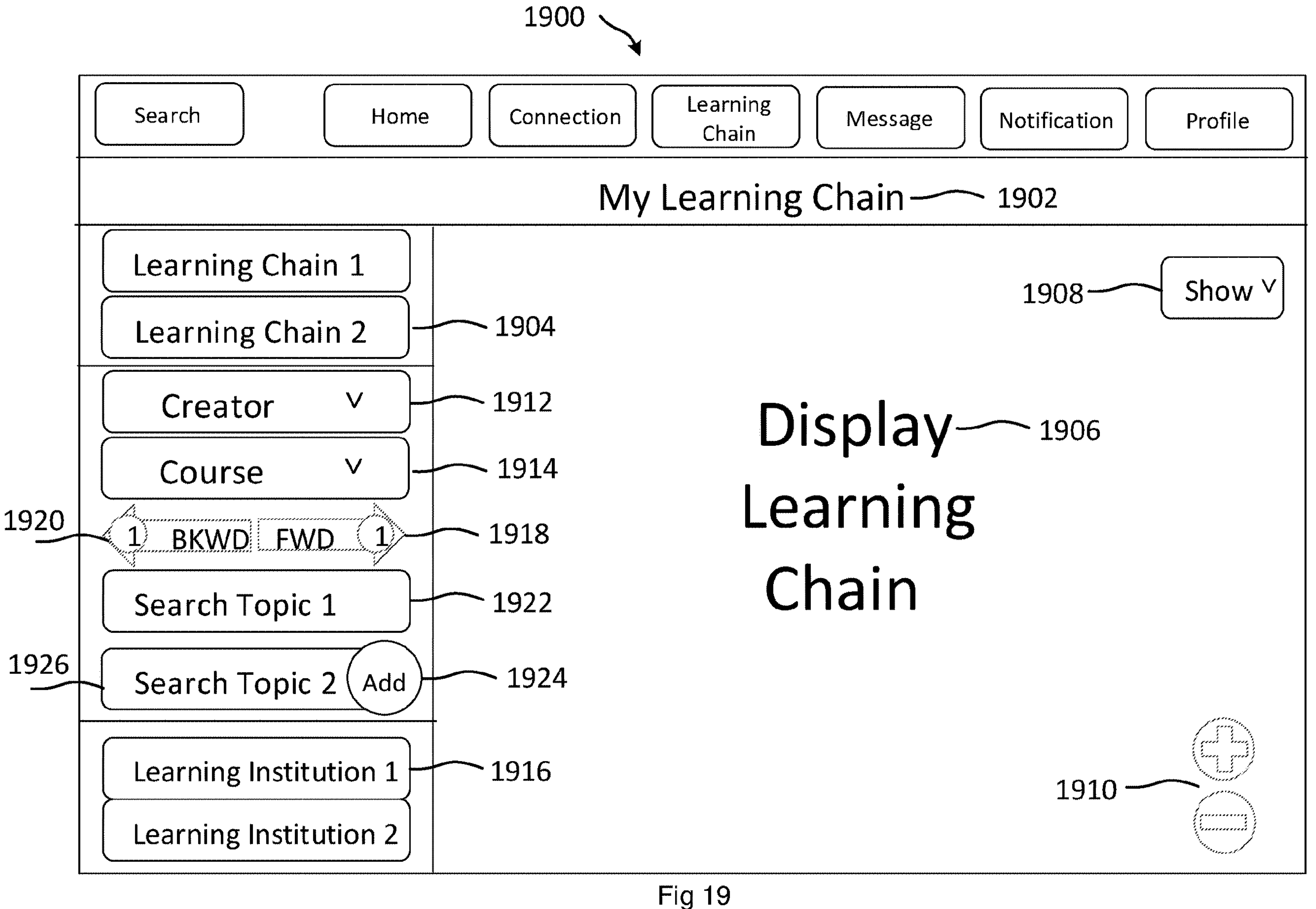
FIG. 19 is a screenshot of a user's learning chains section pertaining to FIG. 4.

Referring to FIG. 19, there is shown a screenshot of a user's learning chain 1900 pertaining to a user's homepage in FIG. 4. A user could press own learning chains 416 on console top. User's learning chain name 1902 is displayed at the top. All user's learning chains 1904 are displayed on the top left either public or private chains. The first learning chain is displayed on the chain zone 1906, a user could choose any learning chain to display. A user could press show 1908 to see user's connections on the same node and could press zoom in/out 1910 to check the sub-nodes or main nodes. It is preferred that a user's learning chains to be one integrated learning chain. Any time a learner starts a course, the user's learning chain is updated automatically, a different color scheme is used for completed and uncompleted courses along the chain. However, a user could prepare a learning chain for a certain course so there will be multiple chains. In addition, a user could sort learning chains or part of a learning chain using different criteria such as learning chain's creator 1912 to find a chain related to a certain learning institution/user, all search results are shown in the results window 1916. A user could sort learning chains using course name 1914 to find the chain of a certain course. A user could press backward chain 1918 to check the prior topics to this chain or press forward chain 1920 to check the next topics to this chain, backward/forward chains could be one step or multi-step. Alternatively, a user could search own chain for a certain topic 1922, or add 1924 another search bar for searching another topic 1926 and see how these topics are connected and could add many search topics to check their chains. Once a user checks own learning chains, there is an option called chain mark in which each learning chain shows the part of the chain a user last accessed that accelerates the return to last time where a user left off.

Figure 20:
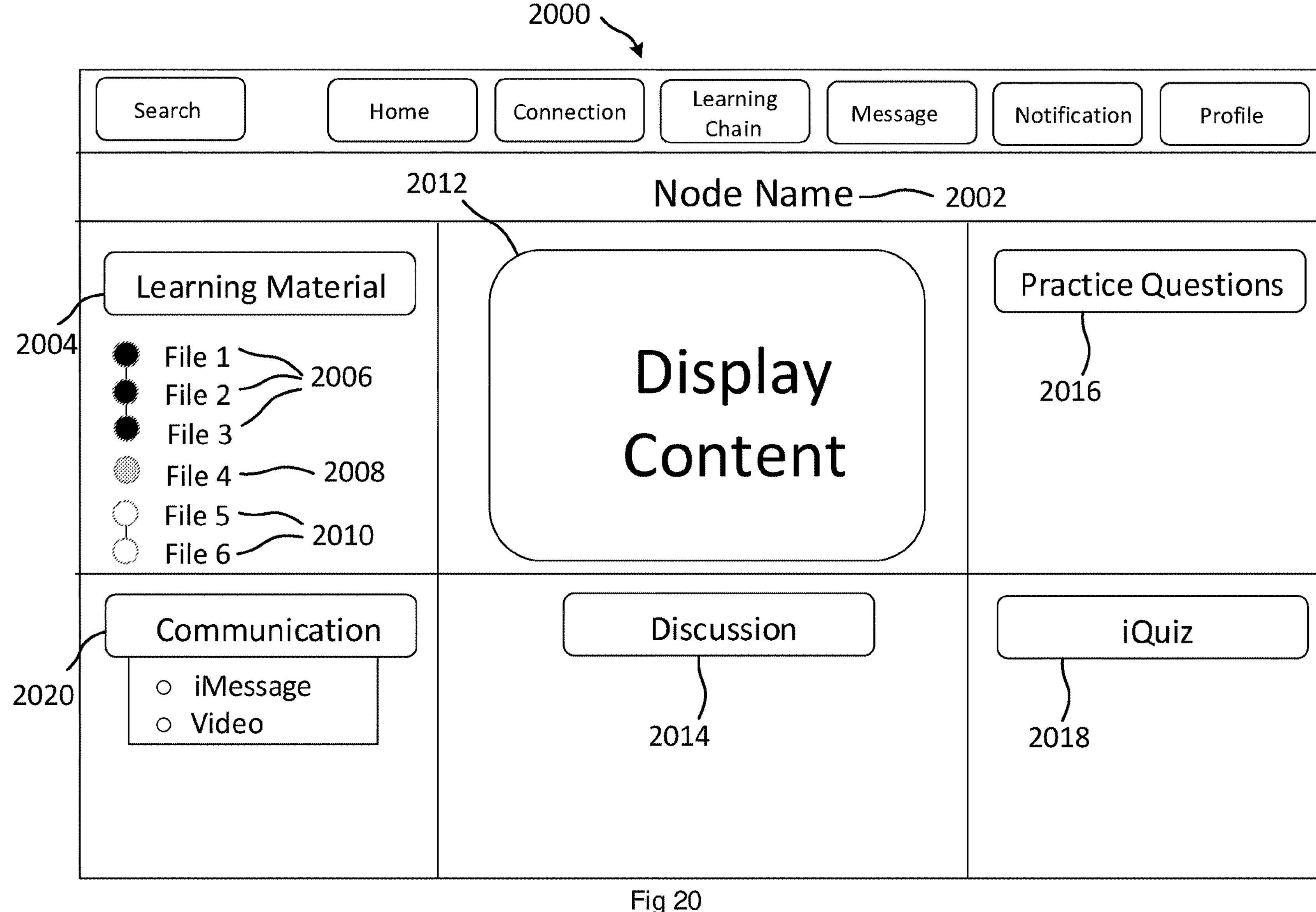
FIG. 20 is a screenshot of accessing an LMS of a certain node.

Referring to FIG. 20, there is shown a screenshot of accessing an LMS of a certain node 2000. Each node has an LMS at the top right and this facilitates finding the right learning material and communications easily because each sub-subtopic has its own LMS. A user presses an LMS to access all learning material and communication tools related to a certain node or group of nodes. The node name 2002 is displayed on the top and learning material category 2004 in on the top left which includes all files related to that subtopic. One idea could be presented in different files format such as word, PowerPoint, Excel, images, code, etc. so all these files would be connected by a vertical chain as displayed in 2006. This means this group of files represent the same idea and consequently has the same practice questions 2016, by pressing another file 2008 or group of files 2010, different practice questions would be displayed 2016. These practice questions assist learners to master the concepts learned by practicing different questions. A user could press practice questions category on the top right 2016 and a user could check the files related to these practice questions by pressing a certain file 2004 that is displayed in display content area 2012 so a user has split screen in which the user has the question and can navigate different learning material to review and practice. These questions could be of any type (such as case studies, multiple choice questions, true and false, etc.) and a detailed solution is provided either in video or text format. Learning material could be available to public 2006 which is reflected in a black circle, or private 2010 to the user only which is reflected in a white circle, or shared with one or more users 2008 which is reflected in a gray circle, the darker the circle, the more users have access to this file. By pressing any file, for example file 1, it will be displayed in the display area 2012 in the middle. These files could be of any type and a user could select any file to be displayed or downloaded. For each node, there is a discussion category 2014 that includes the discussion among the peers related to this specific subtopic. Users explain concepts and make comments in their own words in the discussion category and there is an option to allow comments ranking in which comments with the most likes, replies, and comments by verified users and institutions appear first, consequently, it is easier for learners to learn from peers with quality learning. In order to avoid irrelevant comments, any comment with more dislikes will be removed. Learners have the option to pin some comments so they appear on top for them and could be sorted by date, author, title, etc., and could be archived and printed. Learners share learning material that they prepared with peers which enrich the community of learning. An educator could assess learner through iQuiz on the bottom right 2018. iQuiz is a game-based quiz response system in which all learners, either face-to-face or online, answer a multiple-choice question or discussion question on their devices. This assessment could be online by presenting a set of random questions with certain time duration or it could be done face to face in class in which learners log in to save their answers and set the quiz in real time to make sure learners understand the content before moving to the next subtopic. Alternatively, learners could get a random pin by the lecturer and enter the pin on their devices to access the quiz but the results will be anonymous so learners would not be reluctant to participate. Questions could be displayed as words, images or videos, etc. Questions and answers could have word/character limit as well as time limit. Student's responses are visually presented as percentages and an educator has access to this scoreboard online. Dashboards could be exported as PDF, images, etc. Users could have a one-to-one, one to many, few to many, or many to many collaborations in the communication category 2020. Users could communicate using messages or real-time video streaming for better collaboration, these messages and videos could be stored in this category.

Figure 21:
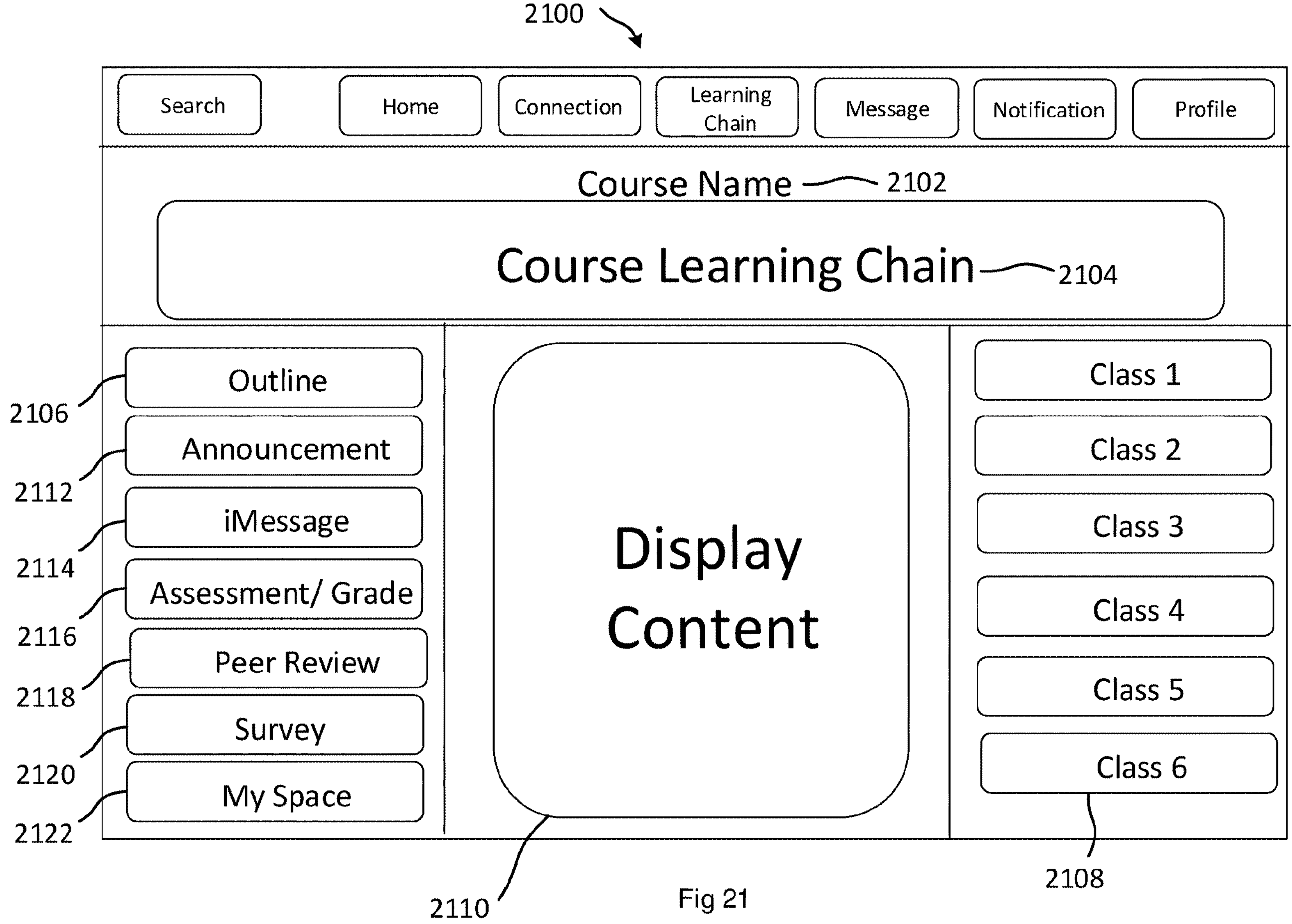
FIG. 21 is a screenshot of a course LMS that includes many nodes pertaining to FIG. 4.

Referring to FIG. 21, there is shown a screenshot of a course LMS that includes many nodes 2100 pertaining to a user's homepage in FIG. 4. A user presses courses 406 enrolled in, completed or created on the user's homepage which automatically directs the page to this course LMS 2100. Each node has an LMS and a group of nodes could have an LMS, consequently, a course has an LMS which is a collection of several nodes and each node still has its own LMS. The LMS of a course is different than the LMS of a node, course LMS includes multiple node LMS and has its own features. Once a course is accessed, course name and code 2102 appears on top followed by course learning chain 2104 that shows all the topics/subtopics in this course. Course outline 2106 appears on the left which is composed of various classes 2108 that appear on the right. Each class includes a learning chain of topics covered which is a part of the main learning chain. Once the class is selected, its learning chain becomes active on course learning chain 2104 while other classes are inactive as well as its learning chain appears in the display zone area 2110 in the middle, a user could zoom in/out to check subtopics and major topics, show connections of peers/educators and press any node to access its LMS. A user could access announcements 2112 related to that course, send iMessage 2114 to other users related to the course overall, check various assessments/marks 2116 related to the whole course to check user's performance, peer review 2118 option in which learners assess each other using a certain rubric. There is an option of peer review in which users assess each other and it could be set using various criteria such as two-to-one in which two users review the same assessment and then the system checks the discrepancies among their feedback and if there is a large variance in marks, the peer review will be diverted to a third reviewer. There is also survey 2120 to give feedback related to this course, and my space 2122 to include all learning material that stays private or shared with a certain user or group of users.

Figure 22:
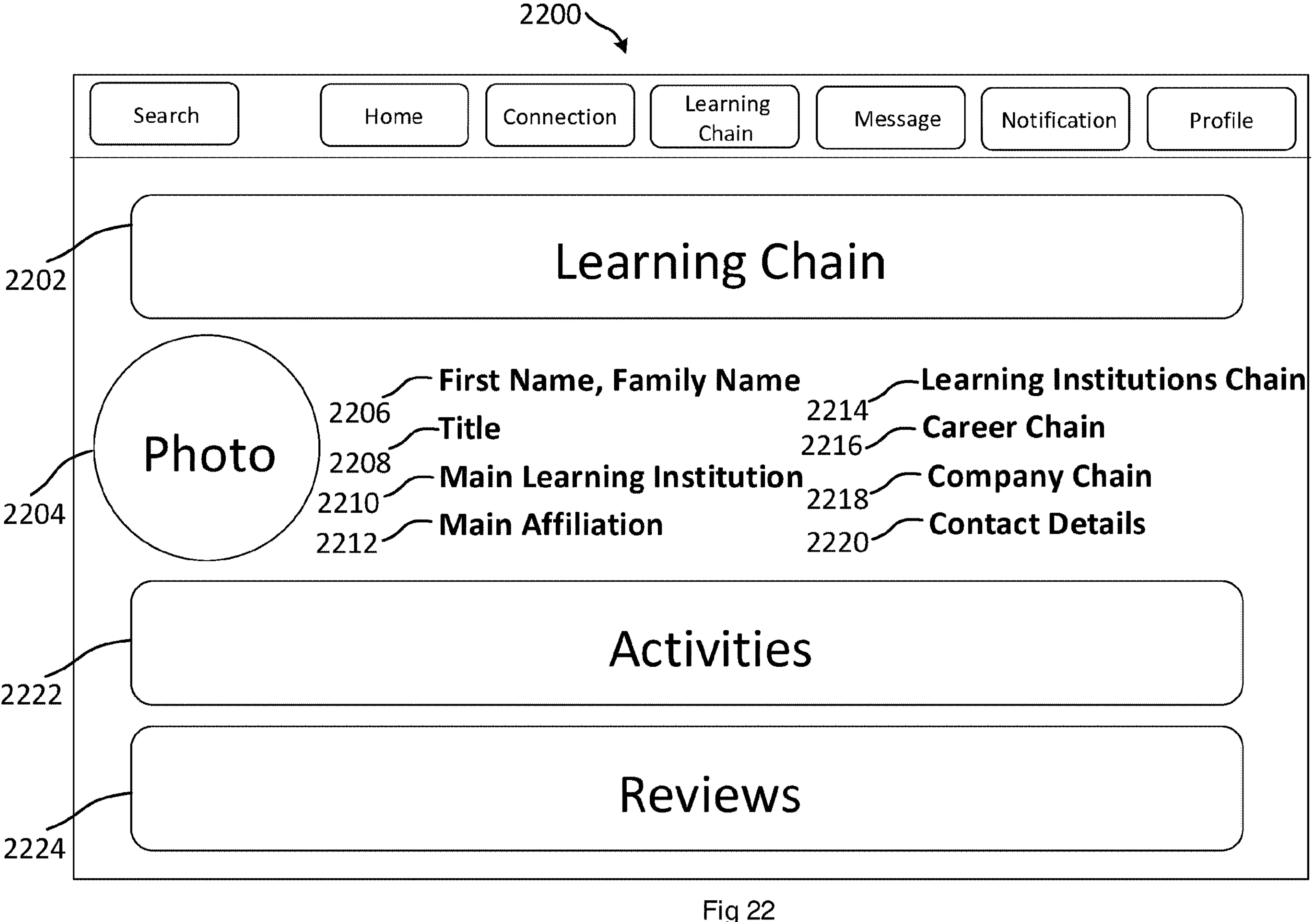
FIG. 22 is a screenshot of a user's profile pertaining to FIG. 4.

Referring to FIG. 22, there is shown a screenshot of a user's profile 2200 pertaining to a user's homepage in FIG. 4. A user accesses own profile 410 on the user's homepage which automatically directs the page to a user's profile 2200.

A user's profile page shows the main learning chain 2202 at the top which shows all the major topics a user learned so it is easier to figure out what are the preferences for this user. User's profile includes major information about the user including a photo 2204 to identify the user easily, a name 2206 that facilitates communication, a title 2208 in order to know more about user's day to day activities, a main learning institution 2210 to check where a user studies and the main affiliation to check where a user works 2212. It also includes a learning institutions chain 2214 to display all learning institutions in a sequence where a user learned, it could be formal or online education which will be differentiated using different color scheme. It includes a career chain 2216 in order to check the jobs of this user in a time sequence and the job description of each job, all related jobs have the same color scheme so it is easy to figure out if a user had a career shift. It includes a company chain 2218 to check the various companies a user worked for and it has contact details 2220 that includes a user's preferred contact tool such as email, webpage, phone number, LinkedIn, etc. this is followed by activities 2222 which shows the recent activities of a user such as publishing learning chains, uploading learning material, posts, comments, etc. and at the bottom, there are reviews 2224 which shows the feedback provided by educators and peers.

Figure 23:
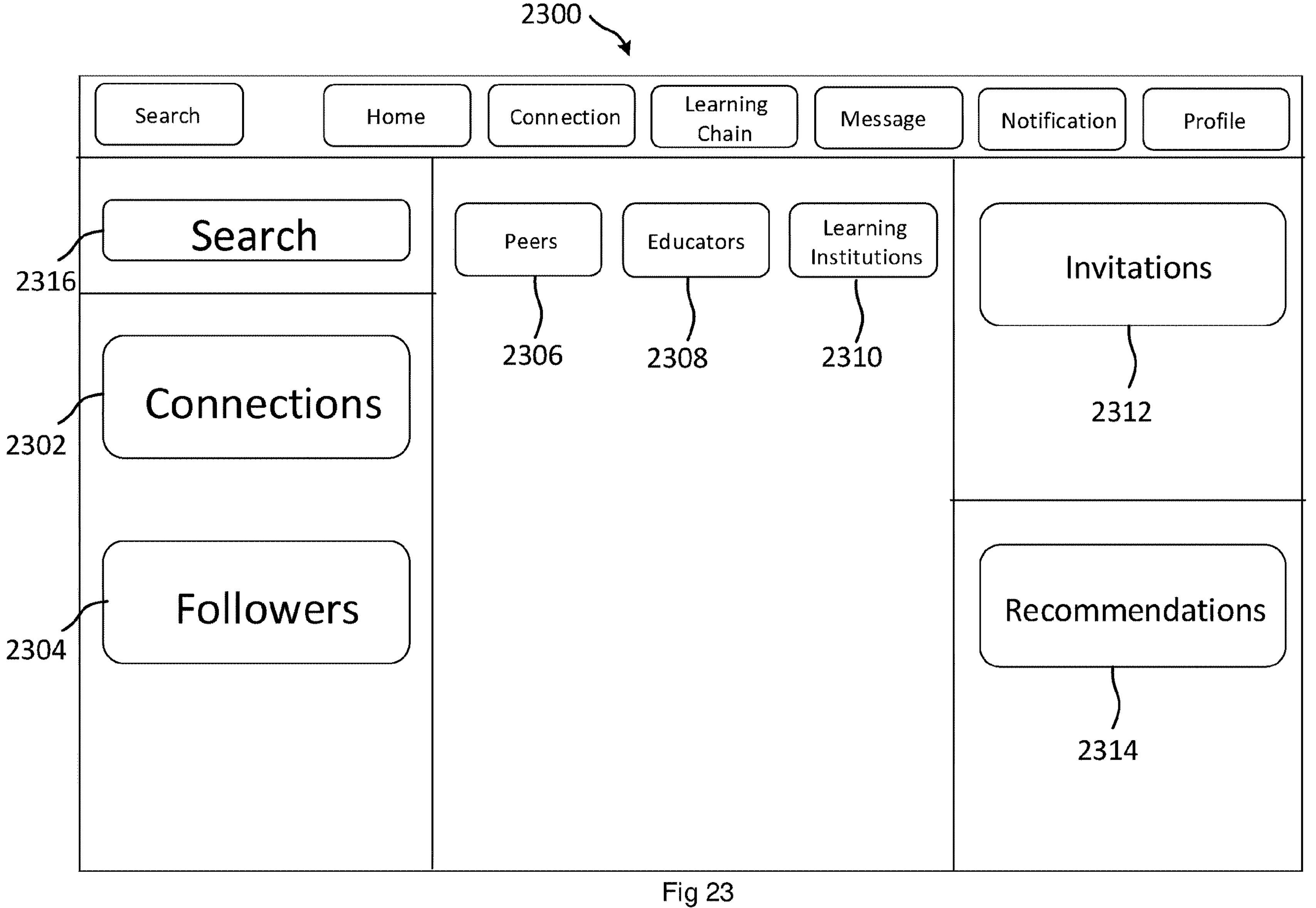
FIG. 23 is a screenshot of a user's connections pertaining to FIG. 4.

Referring to FIG. 23, there is shown a screenshot of a user's connections 2300 pertaining to a user's homepage in FIG. 4. A user accesses own connection 418 on the user's homepage which automatically directs the page to user's connections 2300. On the left side, there are connections category 2302 which shows the number of connections a user has, it is composed of peers 2306, educators 2308 and learning institutions 2310. So, a user presses any tab to check own connections easily based on these categories. A user could also follow some users which appear as followers 2304 that shows the followers into three categories of peers 2306, educators 2308 and learning institutions 2310. A user could access own invitations 2312 on the top right in order to accept or decline the connection. Recommended users 2314 are shown on the bottom right which is based on an algorithm using users learning habits and connections learning areas. Furthermore, a user could search 2316 own connections using the search bar on the top left to find a user that is already connected to.

Figure 24:
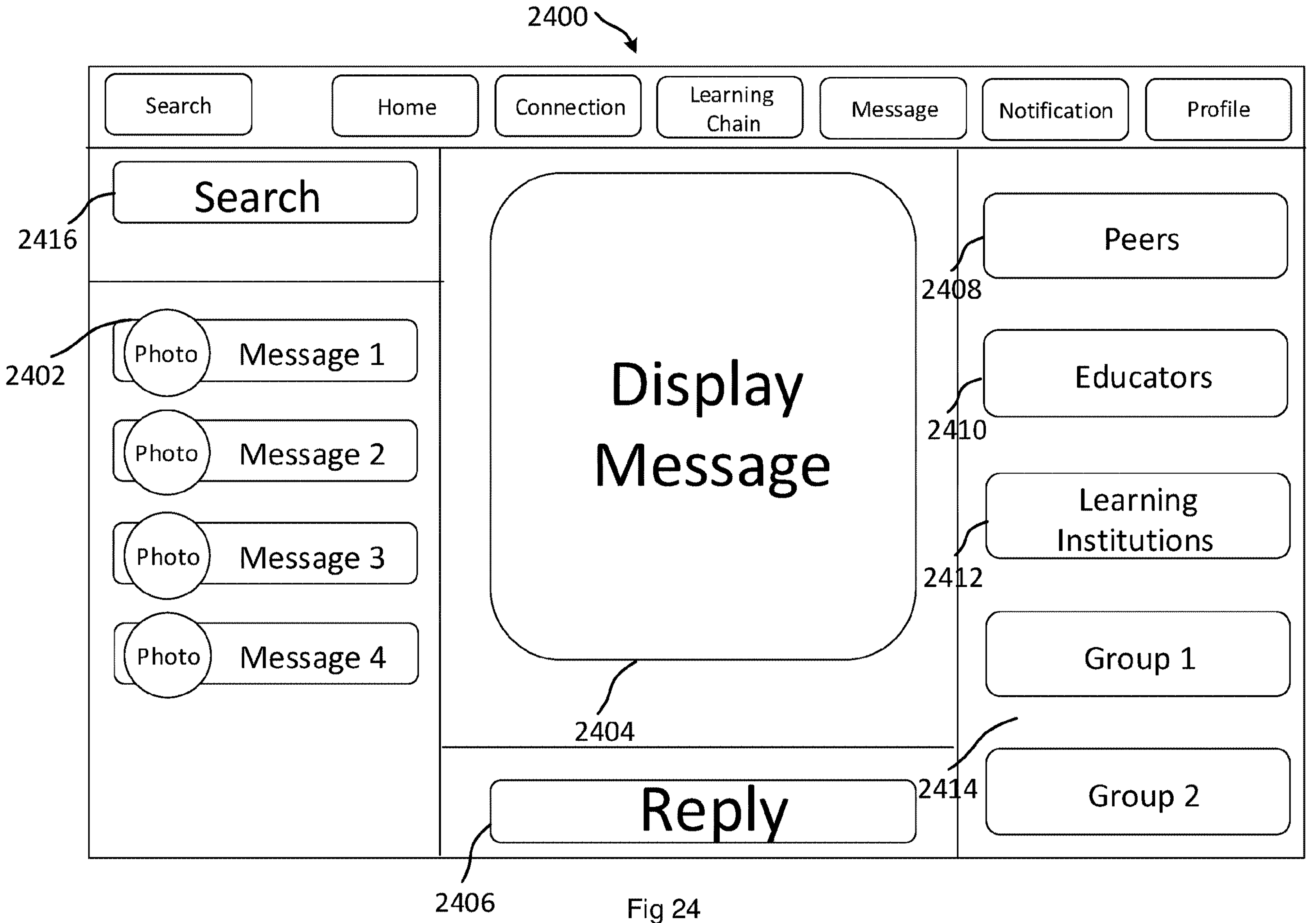
FIG. 24 is a screenshot of a user's messages pertaining to FIG. 4.

Referring to FIG. 24, there is shown a screenshot of a user's messages 2400 pertaining to a user's homepage in FIG. 4. A user accesses messages 414 on the user's homepage which automatically directs the page to user's messages 2400. This message section differs from iMessage section in the LMS, the message section includes the messages among users that are of general nature while the LMS iMessage section includes messages related only to a specific topic/subtopic. All messages are displayed on the left 2402 and the first message is displayed on the display zone 2404 so a user could review the message and take the required action 2406 such as reply, forward, etc. A user could pin important messages to appear on the top of messages or other options are available such as display messages based on a certain user group such as peers 2408, educators 2410 and learning institutions 2412, if a user presses peers tab 2408 all messages from peers will appear on the right 2402 and the selected message is displayed on the display zone 2404. A user also could group messages into a new group and give it a name 2414 based on user's preference so it is accessible easily. Furthermore, a user could search own messages using the search tab 2416 on the top left to find messages easily.

Figure 25:
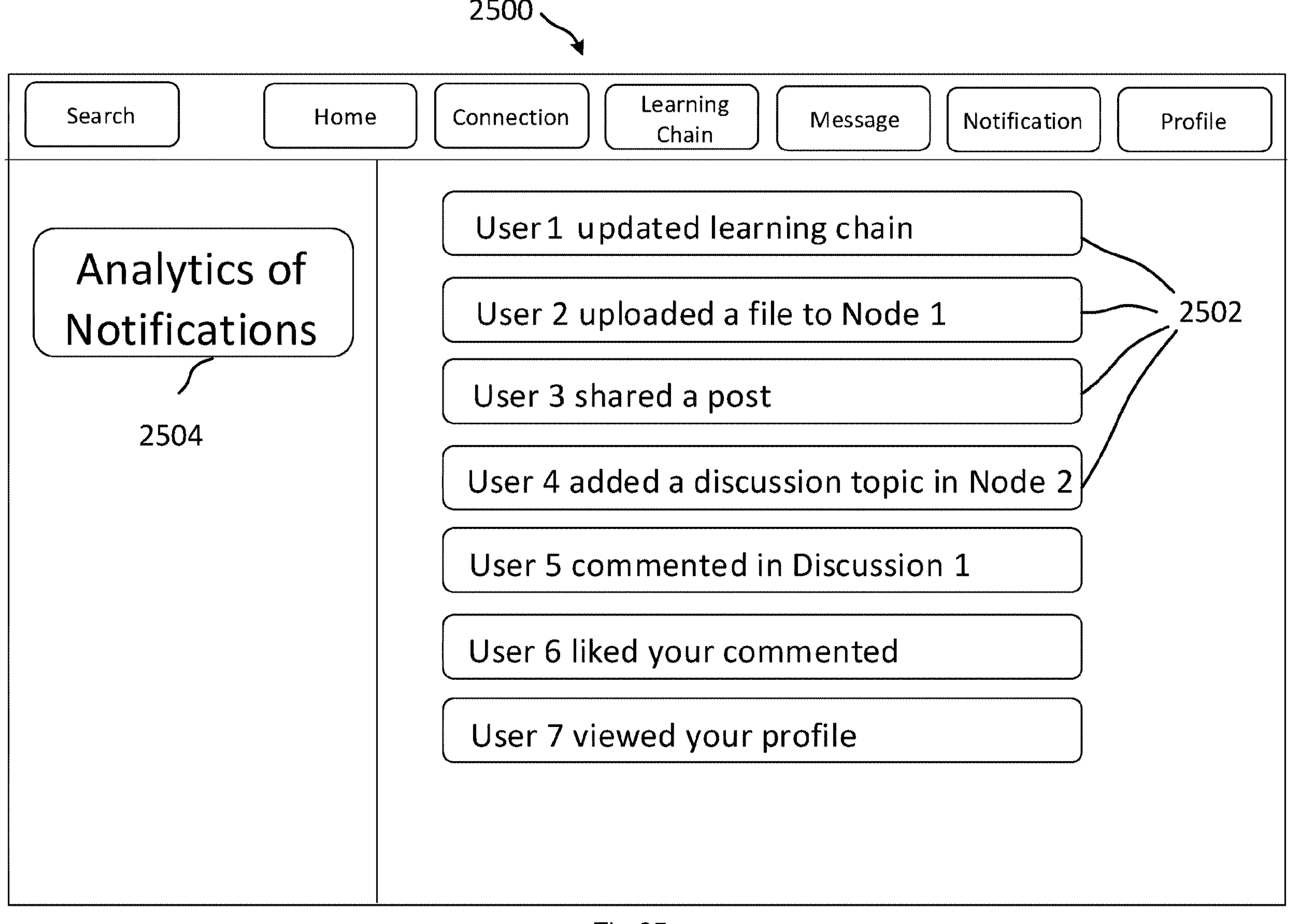
FIG. 25 is a screenshot of a user's notifications pertaining to FIG. 4.

Referring to FIG. 25, there is shown a screenshot of a user's notifications 2500 pertaining to a user's homepage in FIG. 4. A user accesses notification 412 on the user's homepage which automatically directs the page to user's notifications 2500. These notifications 2502 includes alerts for updating learning chains, uploading learning material, user's posts, shares, interactions with user's activities, career opportunities, and updates about other users in your network. There is also analytics of notification 2504 which shows the majority of interactions that are related to what topic, course, career, etc. so a user could have a sense of what a user's connections interact with.

Figure 26:
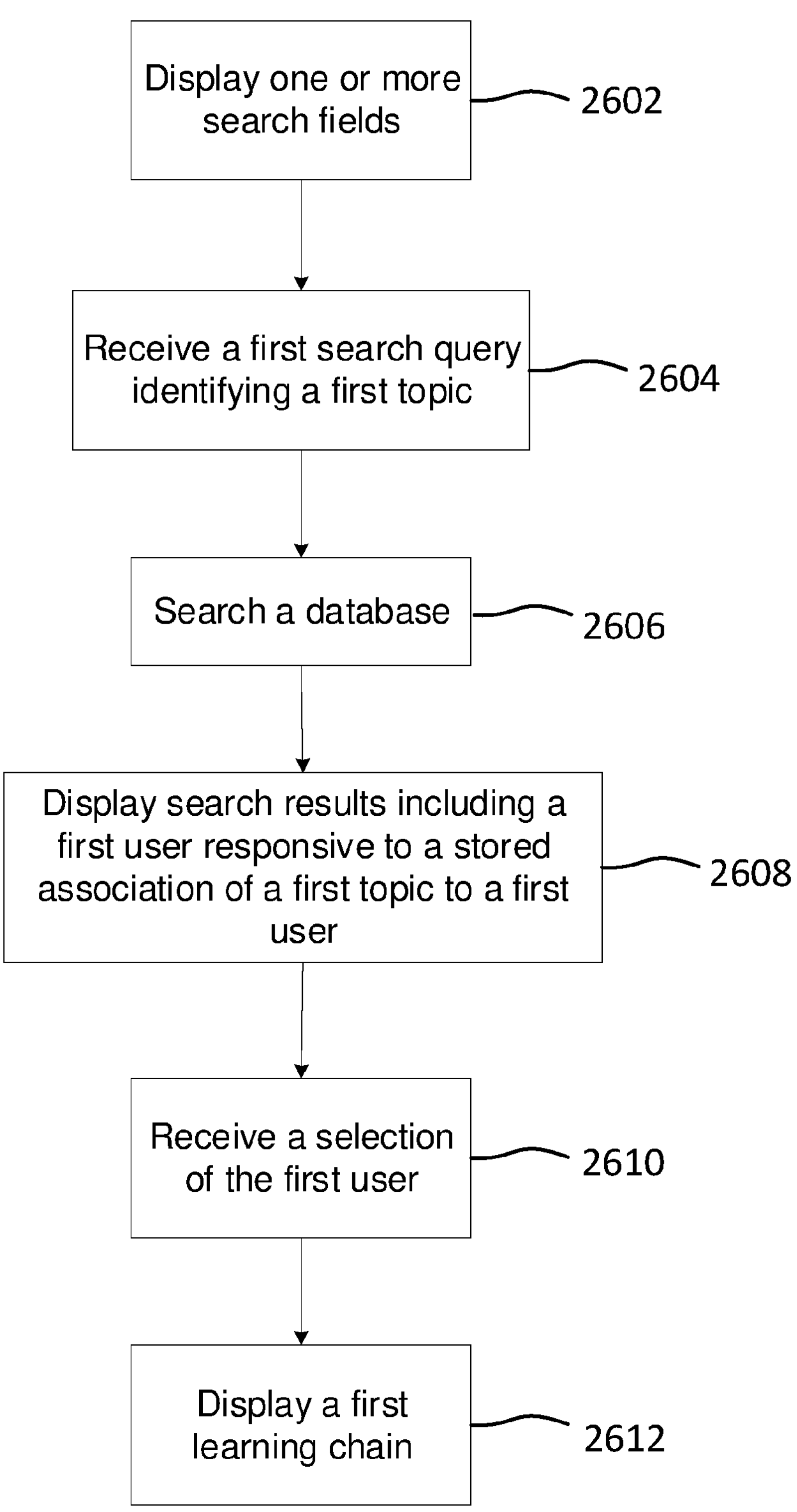
FIG. 26 is a flowchart of a method for performing a search for topics associated with a user.

FIG. 26 is a flowchart of a method for performing a search for topics associated with a user, such as a university or learner. A first user interface having one or more search fields for receiving a search query is displayed 2602. The one or more search fields may include a search field for a first topic 1224 and a search field for a second topic 1228 as shown by example in FIG. 12. A first search query identifying a first topic is received at the one or search fields 2604. In response to receipt of the first search query, database 106 is searched 2606. Database 106 shown in FIG. 1 may store data identifying: a plurality of topics, including the first topic, a second topic different to the first topic and a third topic different to the first and second topics; a plurality of users, including a first user and a second user different to the first user; an association between the first topic and the first user; and a plurality of learning chains of topics, including a first learning chain that includes the first topic and the second topic and not the third topic and indicating that the second topic is associated with the first topic as adjacent topics in the first learning chain; and an association between the first learning chain and the first user. An exemplary learning chain 1710 including a first topic 1712 adjacent to a second topic 1714 associated with a university is illustrated in FIG. 17.

Search results are displayed including the first user responsive to the stored association of the first topic to the first user 2608. In the example shown in FIG. 12, the search results 1210 include "Learning Institution 1", "Learning Institution 2", and "Learning Institution 3". A selection of the first user is received 2610 and in response to receiving this selection, the first learning chain is displayed 2612. The learning chain 1710 includes a graphical representation of the first topic 1712, a graphical representation of the second topic 1714 and a graphical representation of the association 1716 between the first topic 1712 and the second topic 1714, as shown by example in FIG. 17.

Figure 27:
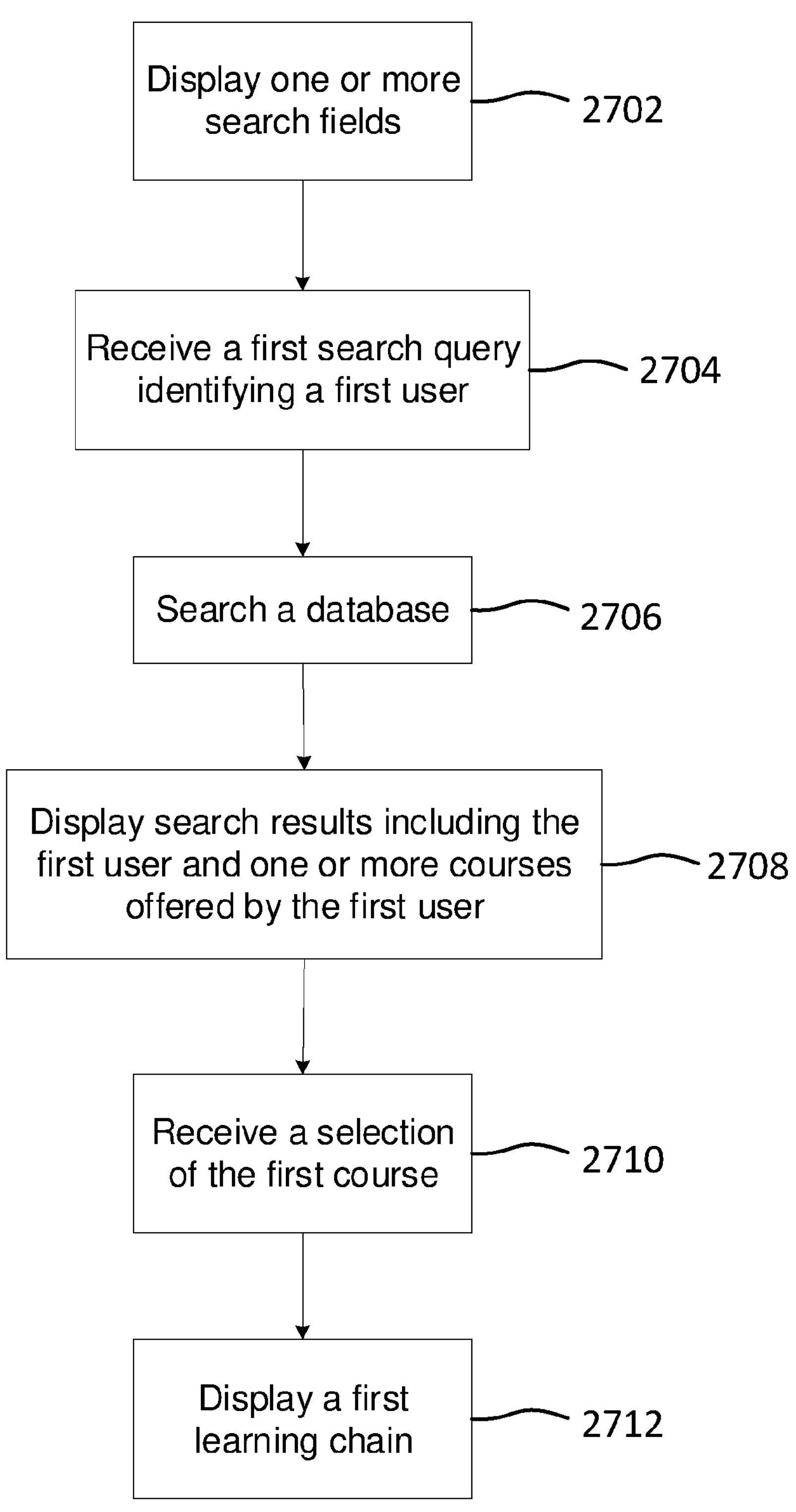
FIG. 27 is a flowchart of a method for performing a search for courses associated with a user.

FIG. 27 is a flowchart of a method for performing a search for courses associated with a user, such as a university. A first user interface having one or more search fields for receiving a search query is displayed 2702. A first search query identifying a first user is received at the one or search fields 2704. FIG. 13 shows an example of a search field 1322 for searching for a first user, such as a university. In response to receipt of the first search query, database 106 is searched 2706. Database 106 shown in FIG. 1 may store data identifying: a plurality of topics including a first topic, a second topic different to the first topic and a third topic different to the first and second topics; a plurality of courses, including the first course, a second course different to the first course; a plurality of users, including a first user and a second user different to the first user; an association between the first topic and the first user; and a plurality of learning chains of topics, including a first learning chain associated with the first course.

Search results are displayed including the first user and one or more courses offered by the first user 2708. A selection of the first course is received 2710 and in response to receiving this selection, the first learning chain is displayed 2712. An exemplary embodiment of a learning chain associated with a course 1702 is shown in FIG. 17. The learning chain includes a graphical representation of a plurality of topics including the second topic 1714 located adjacent the first topic 1712.

Figure 28:
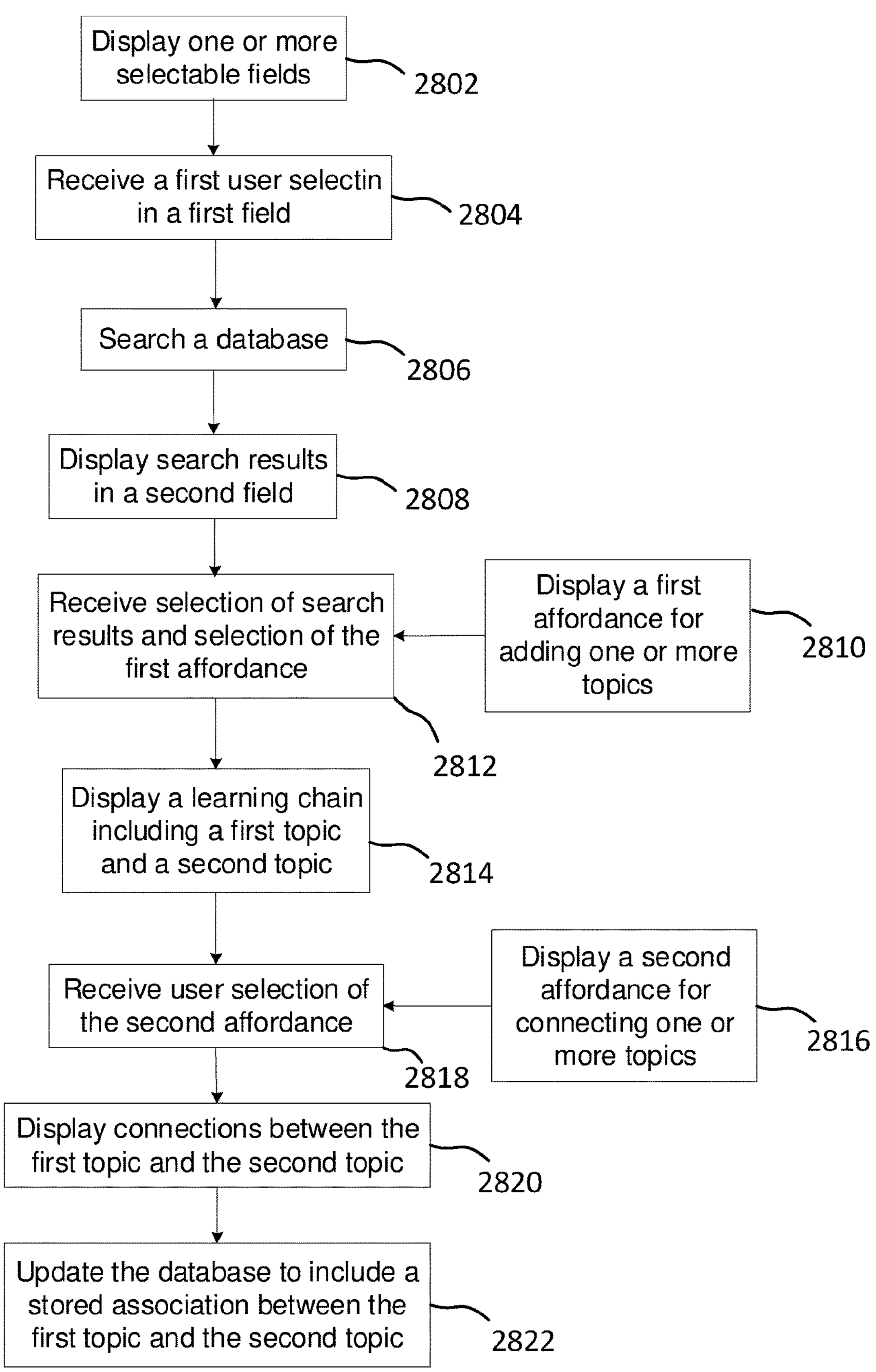
FIG. 28 is a flowchart of a method for generating a learning chain.

FIG. 28 is a flowchart of a method for generating a learning chain. At step 2802, a first user interface 600 is displayed having one or more selectable fields for selecting a field of study; a first area for displaying a learning chain associated with the field of study; a first affordance 2810 for adding one or more topics associated with the field of study to the first area; and a second affordance 2816 for connecting two or more topics in the first area. An exemplary first user interface for generating a learning chain is illustrated in FIG. 6. The user interface 600 includes one or more selectable fields including a "Select Field" field 602, a "Select Subfield" field 604, a "Select topic" field 606 and a "Select Sub-topic" field 608. The user interface 600 further includes a first area 610 for displaying a learning chain, a first affordance "Add" 618 for adding one or more topics associated with the field of study 604; and a second affordance "Connect" 612 for connecting the topics displayed in the first area 610.

A first user selection identifying the field of study is received at a first selectable field 2804. In response to receipt of the first user selection, a database is searched 2806. For example, the database 106 may store data identifying a plurality of topics associated with the field of study, including a first topic, a second topic different to the first topic and a third topic different to the first and second topics.

The search results are displayed and include the first topic and the second topic in a second selectable field 2808. A user selection of the first topic and the second topic in the second selectable field and user selection of the first affordance is received 2812. In response to receiving selection of the first affordance and selection of the first topic and the second topic, display a graphical representation of the first topic and a graphical representation of the second topic in the first area 2814. In the example shown in FIG. 6, a user may select a first topic and a second topic from field 606 and select the first affordance "Add" to add these topics to the first area 610.

User selection of the second affordance is received 2818 and in response to receiving this selection, a learning chain is generated by displaying a graphical representation of the association between the first topic and the second topic 2820. In the example shown in FIG. 6, a user may select the second affordance "Connect" to connect the displayed first topic and the displayed second topic and generate a learning chain in the first area 610.

In response to receiving selection of the second affordance, the database is updated to include a stored association between the first topic and the second topic 2822.

Embodiments of the processes described with reference to FIGS. 26-28 may be implemented on an electronic device with a display, such as device 102. It will be appreciated that some of the steps described herein may be performed in a different sequence without departing from the general concept of the present disclosure.

Additional embodiments and variations to the embodiments described above will be apparent from the following clauses and statements.

Clause A: A learning network system the system comprising:

a server that communicates with each user over a network, there are at least three types of users including learners, educators, and institutions. each user has predefined characteristics that indicate the multiple predetermined roles on the learning chain; and a learning chain design element repository communicatively coupled to the server, where each chain in the repository comprises an attribute.

The system of clause A, where the system further comprises an application server communicatively coupled to the server and learning chain design repository.

The system of clause A, where the platform includes all disciplines, each discipline is composed of topics, each topic is composed of subtopics and each subtopic is composed of sub subtopics and so on.

The system of clause A, where disciplines, degrees, certificates, courses, topics, subtopics, etc. are represented by a node, the number of subtopics is reflected on the size of the node and the number of connections is reflected on the thickness of the node border.

The system of clause A, where each learning institution creates learning chains for all degrees, certificates, courses, topics, subtopics, etc by connecting the topics on the system or using customized templates. In some embodiments learning institutions collaborate to create an integrated learning chain for all topics/subtopics starting from school to university. In some embodiments a learning institution could create a learning chain starting from a certain topic or for a certain course so the first node of the chain would be black which means there are prerequisite topics that are not shown by this institution.

The system of clause A, where learners search learning chains of each institution to compare and choose the right course. In some embodiments learners have the option to search forward learning chain to check the topics required to get a certain job. In some embodiments learners have the option to search backward learning chain to check the prerequisite topics to understand a certain topic. In some embodiments learners choose a learning chain provided by one or more learning institution, a color code distinguishes each institution. In some embodiments learners zoom in to check the topic/subtopic of a node on a learning chain and zoom out to check the major topic/field of study of a node on a learning chain. In some embodiments a learner, educator and learning institution create, edit, modify, copy, print, export, preview, integrate (separate) a certain learning chain into (from) another chain, etc. In some embodiments a learning chain could be publicly available or private for a certain user or group of users.

The system of clause A, where a publisher creates a learning chain for each book to show the sequence of topics/subtopics as well as the sequence of topics among many books and topics overlap.

The system of clause A, where a researcher creates a learning chain for each research paper to show the sequence of topics/subtopics. Learning institutions could expand this chain by including all prior topics that are necessary to understand this research paper.

The system of clause A, where learners connect with learning institutions. In some embodiments learners and educators are shown on each node of the learning chain. In some embodiments learners connect with their peers on the same node of the learning chain or forward/backward nodes. In some embodiments learners connect with educators on the same node of the learning chain or forward/backward nodes. In some embodiments learning institutions connect with recruiters and companies to update the learning chain based on the skills gap. In some embodiments educators connect with other educators on the same node of the learning chain or forward/backward nodes for better collaboration. In some embodiments recruiters and companies check learners' learning chains to choose and connect with the right candidate for an internship, graduate program, and vacancy.

The system of clause A, where each node on the learning chain is linked to a learning management system (LMS) that includes learning material, synchronous communication, asynchronous communication, etc. chatbot is used to facilitate the administrative stuff and answer learners' enquiries.

In some embodiments users have the option to make the LMS of one or more nodes public or private and users can choose which component would be public or private (learning material, synchronous communication, asynchronous communication, announcement, assessment and grade center). An automated message is sent to learner's cellular to remind them about the assessment before deadline at different frequencies and check their progress periodically. Learners have the option to reply the message by the word 'done' to stop receiving more messages about this assessment.

In some embodiments users could link the LMS of some nodes into an LMS for a course.

In some embodiments where learners communicate with peers and educators either online or face to face.

In some embodiments users have the option to show if they are online.

In some embodiments, learners communicate with other users through synchronous communication such as video streaming and chat, these communications are stored on each node LMS which makes it easier to categorize, archive, and retrieve.

In some embodiments, learners communicate with other users through asynchronous communication such as discussion forum and email, these communications are stored on each node LMS which makes it easier to categorize, archive, and retrieve.

The system of clause A, where learning institutions could assign estimated time and credit points for each topic on the learning chain. In some embodiments learners could tailor their courses by choosing the topics on the learning chain. In some embodiments learning institutions certify learning chains for learners and educators. In some embodiments learning institutions compare learning chains from different learning institutions to assist with credit point transfer from one institution to another. In some embodiments learners access different learning chains to check prerequisite, corequisite, and anti-requisite courses.

Clause B: A method for providing learning chains for a community of users in a network-based system, the method comprising the steps of:

a. Logging into the system of clause A;
b. Creating, modifying or publishing a learning chain;
c. Searching and selecting one or more learning chains;
d. Connecting peers and sharing knowledge and experience; and
e. Accessing an LMS at each node.

The method of clause B, where each user has a profile that includes basic information, a photo/logo, learning chain, company chain, career chain, etc.

The method of clause B, where there is a feed that updates the learning activities of a user's connections who share the same node.

The method of clause B, where educators have access to dashboards that include learner's performance analytics, some insights could be shared to learners while others are available to educators only.

The method of clause B, where learners rank and provide feedback for educators and learning institutions.

The method of clause B, where educators provide feedback and recommendation for learners.

The method of clause B, where users preview and export a learning chain or part of a learning chain as a link, pdf, image, etc. In some embodiments a learning chain could be accessed in desktop browsers and mobile apps. In some embodiments a learning chain could be presented in 2D and 3D. In some embodiments a learning chain could be displayed using augmented reality, mixed reality, and virtual reality. In some embodiments a learning chain could be navigated using voice navigation tool. In some embodiments a learning chain could have other applications such as job activities in which each company creates a job chain to check the duties of each employee and how they are interdependent for better collaboration, it could also be applied to doctors to make a chain of diseases, pharmacists to make chain of medicine, etc.

Within the accompanying claims, references to "first", "second", "third" etc refer to different instances of the referenced entity and do not and are not intended to refer to or require an order or temporal relationship.

What is claimed is:

1. A method including:

displaying, on a display of an electronic device by an application executing on the electronic device, a first user interface having one or more search fields for receiving a search query;

receiving, at the one or more search fields of the first user interface displayed on the display, a first search query, wherein the first search query identifies a career selected by the first user;

in response to receipt of the first search query, accessing, by the application via a communications network a repository system, and searching the database by the application, wherein the database is communicatively coupled with the application through the repository system, and the database stores data identifying:

a plurality of topics, including the first topic, a second topic different to the first topic and a third topic different to the first and second topics;

one or more sub-topics associated with the first topic and the second topic;

a plurality of users, including a first user and a second user different to the first user;

an association between the career and the plurality of topics;

an association between the first topic and the first user;

an association between the career and the plurality of users;

a plurality of learning chains, including a first learning chain that includes the first topic and the second topic and not the third topic and wherein the learning chain indicates that the second topic is associated with the first topic as adjacent topics in the first learning chain and a second learning chain including one or more sub-topics associated with the first topic; and an association between the first learning chain and the first user;

displaying, by the application in the first user interface, search results, the search results including a plurality of users having learning chains associated with the career, including the first user responsive to the stored association of the first topic to the first user and the stored association of the career and the plurality of topics;

receiving, by the application in the first user interface, a selection of the first user from the plurality of users;

in response to receiving selection of the first user, displaying, by the application in the first user interface, the first learning chain of the first user for the selected career, wherein the first learning chain includes a graphical representation of the first topic, a graphical representation of the second topic and a graphical representation of the association between the first topic and the second topic;

while displaying the first learning chain, receiving a selection in relation to the first topic; and in response to receiving the selection in relation to the first topic, replacing the display of the first learning chain with the second learning chain including the plurality of sub-topics associated with the first topic.

2. The method of claim 1, wherein the database stores data identifying an association between the second user and the second topic and the method includes:

while displaying the learning chain, receiving a selection of the second topic;

receiving input requesting display of users associated with the second topic;

based on the stored association between the second user and the second topic, displaying indicia identifying the second user.

3. The method of claim 1, wherein the database stores data identifying adjacent topics in a plurality of the learning chains, including the first learning chain, and wherein the graphical representation of at least the first topic is provided with one or more visual indicators indicating the number of topics adjacent to the first topic in the plurality of learning chains.

4. The method of claim 1, wherein the graphical representation of the first topic and the graphical representation of the second topic are dimensioned to be indicative of the number of sub-topics associated with the respective first topic or the second topic.

5. The method of claim 1, further including receiving user input of a third user editing at least one of the graphical representation of the first topic, the graphical representation of the second topic, and the graphical representation of the association between the first topic and the second topic and wherein the method includes storing in the database, associated with the third user, a third learning chain, the third learning chain being the first learning chain edited in accordance with the received user input.

6. The method of claim 1, wherein the graphical representation of the first topic is provided with an affordance and selection of the affordance transitions the first user interface to a second user interface for displaying learning material related to the first topic.

7. The method of claim 1, further including:

displaying a first affordance on the first user interface;

receiving a user selection of the first affordance and a user selection of the first topic;

in response to selection of the first affordance and selection of the first topic, replacing the display of the first learning chain with the second learning chain including a graphical representation of one or more sub-topics associated with the first topic and a graphical representation of the associations between the one or more sub-topics.

8. The method of claim 7, further including:

displaying a second affordance on the user interface;

receiving a user selection of the second affordance and a user selection of the first topic;

in response to selection of the second affordance and selection of the first topic, replacing the display of the first learning chain with a third learning chain including a graphical representation of one or more courses associated with the first topic and a graphical representation of the associations between the one or more courses.

9. The method of claim 7, further including:

displaying, on the first user interface, a first part of the first learning chain and a third affordance;

receiving a user selection of the third affordance;

in response to selection of the third affordance, replacing the display of the first part of the first learning chain with a second part of the first learning chain, different to the first part of the first learning chain.

10. The method of claim 9, further including:

displaying, on the first user interface, the second part of the first learning chain and a fourth affordance;

receiving a user selection of the fourth affordance;

in response to selection of the fourth affordance, replacing the display of the second part of the first learning chain with the first part of the first learning chain.

11. The method of claim 9, wherein the third affordance and/or the fourth affordance are provided with a visual indicator indicating a number of topics in the first learning chain that are not currently displayed and which are displayed by one or more selections of the third or fourth affordance respectively.

12. The method of claim 1, wherein the database stores data assigning a public or a private permission for displaying the first learning chain to each of the plurality of users.

13. A non-transitory machine readable storage medium, having instructions stored thereon, which when executed by one or more processors, cause the one or more processors to perform a method, comprising:

displaying, on a display of an electronic device by an application executing on the electronic device, a first user interface having one or more search fields for receiving a search query;

receiving, at the one or more search fields of the first user interface displayed on the display, a first search query, wherein the first search query identifies a career selected by the first user;

in response to receipt of the first search query, accessing, by the application via a communications network a repository system, and searching the database by the application, wherein the database is communicatively coupled with the application through the repository system, and the database stores data identifying:

a plurality of topics, including the first topic, a second topic different to the first topic and a third topic different to the first and second topics;

one or more sub-topics associated with the first topic and the second topic;

a plurality of users, including a first user and a second user different to the first user;

an association between the career and the plurality of topics;

an association between the first topic and the first user;

an association between the career and the plurality of users;

a plurality of learning chains, including a first learning chain that includes the first topic and the second topic and not the third topic and wherein the learning chain indicates that the second topic is associated with the first topic as adjacent topics in the first learning chain and a second learning chain including one or more sub-topics associated with the first topic; and an association between the first learning chain and the first user;

displaying, by the application in the first user interface, search results, the search results including a plurality of users having learning chains associated with the career, including the first user responsive to the stored association of the first topic to the first user and the stored association of the career and the plurality of topics;

receiving, by the application in the first user interface, a selection of the first user from the plurality of users;

in response to receiving selection of the first user, displaying, by the application in the first user interface, the first learning chain of the first user for the selected career, wherein the first learning chain includes a graphical representation of the first topic, a graphical representation of the second topic and a graphical representation of the association between the first topic and the second topic;

while displaying the first learning chain, receiving a selection in relation to the first topic; and in response to receiving the selection in relation to the first topic, replacing the display of the first learning chain with the second learning chain including the one or more sub-topics associated with the first topic.

14. The non-transitory machine readable medium of claim 13, wherein the database stores data identifying an association between the second user and the second topic and the method includes:

while displaying the learning chain, receiving a selection of the second topic;

receiving input requesting display of users associated with the second topic;

based on the stored association between the second user and the second topic, displaying indicia identifying the second user.

15. The non-transitory machine readable medium of claim 13, wherein the database stores data identifying adjacent topics in a plurality of the learning chains, including the first learning chain, and wherein the graphical representation of at least the first topic is provided with one or more visual indicators indicating the number of topics adjacent to the first topic in the plurality of learning chains.

16. The non-transitory machine readable medium of claim 13, wherein the graphical representation of the first topic and the graphical representation of the second topic are dimensioned to be indicative of the number of sub-topics associated with the respective first topic or the second topic.

17. The non-transitory machine readable medium of claim 13, further including receiving user input of a third user editing at least one of the graphical representation of the first topic, the graphical representation of the second topic, and the graphical representation of the association between the first topic and the second topic and wherein the method includes storing in the database, associated with the third user, a third learning chain, the second learning chain being the first learning chain edited in accordance with the received user input.

18. The non-transitory machine readable medium of claim 13, further including:

displaying a first affordance on the first user interface;

receiving a user selection of the first affordance and a user selection of the first topic; in response to selection of the first affordance and selection of the first topic, replacing the display of the first learning chain with the second learning chain including a graphical representation of one or more sub-topics associated with the first topic and a graphical representation of the associations between the one or more sub-topics.

19. A system, comprising:

a non-transitory machine readable storage medium having instructions stored thereon; and one or more processors, coupled with the non-transitory machine readable storage medium, configured to execute the instructions cause the one or more processors to perform a method, comprising:

displaying, on a display of an electronic device by an application executing on the electronic device, a first user interface having one or more search fields for receiving a search query, receiving, at the one or more search fields of the first user interface displayed on the display, a first search query, wherein the first search query identifies a career selected by the first user, in response to receipt of the first search query, accessing, by the application via a communications network a repository system, and searching the database by the application, wherein the database is communicatively coupled with the application through the repository system, and the database stores data identifying:

a plurality of topics, including the first topic, a second topic different to the first topic and a third topic different to the first and second topics, one or more sub-topics associated with the first topic and the second topic;

a plurality of users, including a first user and a second user different to the first user, as association between the career and the plurality of topics;

an association between the first topic and the first user, an association between the career and the plurality of users;

a plurality of learning chains, including a first learning chain that includes the first topic and the second topic and not the third topic and wherein the learning chain indicates that the second topic is associated with the first topic as adjacent topics in the first learning chain and a second learning chain including one or more sub-topics associated with the first topic, and an association between the first learning chain and the first user, displaying, by the application in the first user interface, search results, the search results including a plurality of users having learning chains associated with the career, including the first user responsive to the stored association of the first topic to the first user and the stored association of the career and the plurality of topics, receiving, by the application in the first user interface, a selection of the first user from the plurality of users, and in response to receiving selection of the first user, displaying, by the application in the first user interface, the first learning chain of the first user for the selected career, wherein the first learning chain includes a graphical representation of the first topic, a graphical representation of the second topic and a graphical representation of the association between the first topic and the second topic;

while displaying the first learning chain, receiving a selection in relation to the first topic; and in response to receiving the selection in relation to the first topic, replacing the display of the first learning chain with the second learning chain including the plurality of sub-topics associated with the first topic.

* * * * *